US008243834B2

(12) United States Patent
Kishigami et al.

(10) Patent No.: US 8,243,834 B2
(45) Date of Patent: Aug. 14, 2012

(54) WIRELESS COMMUNICATION DEVICE

(75) Inventors: Takaaki Kishigami, Tokyo (JP);
Hidekuni Yomo, Tokyo (JP)

(73) Assignee: Panasonic Corporation, Osaka (JP)

( * ) Notice: Subject to any disclaimer, the term of this patent is extended or adjusted under 35 U.S.C. 154(b) by 944 days.

(21) Appl. No.: 12/159,080

(22) PCT Filed: Jan. 5, 2007

(86) PCT No.: PCT/JP2007/050042
§ 371 (c)(1),
(2), (4) Date: Jun. 24, 2008

(87) PCT Pub. No.: WO2007/078001
PCT Pub. Date: Jul. 12, 2007

(65) Prior Publication Data
US 2009/0175367 A1 Jul. 9, 2009

(30) Foreign Application Priority Data

Jan. 6, 2006 (JP) .................................. 2006-001588
Jan. 4, 2007 (JP) .................................. 2007-000138

(51) Int. Cl.
*H04K 1/10* (2006.01)
(52) U.S. Cl. ........ 375/260; 375/262; 375/267; 375/271; 375/316; 375/340
(58) Field of Classification Search .................. 375/259, 375/260, 267, 271, 295, 296, 299, 300, 316, 375/324, 342, 262, 306
See application file for complete search history.

(56) References Cited

U.S. PATENT DOCUMENTS

| 7,653,142 B2 * | 1/2010 | Ketchum et al. ............. 375/267 |
| 2003/0128660 A1 | 7/2003 | Ito |
| 2004/0062317 A1 * | 4/2004 | Uesugi et al. ................ 375/260 |
| 2004/0165675 A1 | 8/2004 | Ito |
| 2005/0073949 A1 | 4/2005 | Hayashi |
| 2006/0148429 A1 * | 7/2006 | Inogai et al. ............... 455/115.1 |
| 2006/0159188 A1 * | 7/2006 | Izumi ........................... 375/260 |
| 2006/0193298 A1 * | 8/2006 | Kishigami et al. ............ 370/338 |
| 2007/0153673 A1 * | 7/2007 | Tomisato et al. ............. 370/208 |

(Continued)

FOREIGN PATENT DOCUMENTS

JP 2001-053712 2/2001

(Continued)

OTHER PUBLICATIONS

G. Foschini, "Layered Space-Time Architecture for Wireless Communication in a Fading Environment When Using Multi-Element Antennas," Bell Labs Technical Journal, Autumn 1996, pp. 41-59.

(Continued)

*Primary Examiner* — Hirdepal Singh
(74) *Attorney, Agent, or Firm* — Dickinson Wright PLLC

(57) ABSTRACT

A wireless communication device (1) comprises a spatially-multiplexed PSC extracting section (8) for extracting a spatially multiplexed known pilot subcarrier signal (S5) from the received multicarrier-modulated signal, a reference signal generating section (7) for generating a reference signal (S4) of the spatially-multiplexed pilot subcarrier signal, and a phase compensating section (9) for compensating the phase difference of the received signal (S1) according to the pilot subcarrier signal (S5) extracted by the spatially-multiplexed pilot subcarrier extracting section (8) and the reference signal (S4). Therefore, even if a pilot subcarrier signal is spatially multiplexed and transmitted, phase difference detection and phase compensation can be performed by a simple constitution.

8 Claims, 18 Drawing Sheets

U.S. PATENT DOCUMENTS

| | | | | |
|---|---|---|---|---|
| 2007/0155433 | A1* | 7/2007 | Ito et al. | 455/562.1 |
| 2007/0237262 | A1* | 10/2007 | Hwang et al. | 375/316 |
| 2009/0028258 | A1* | 1/2009 | Ma et al. | 375/260 |

FOREIGN PATENT DOCUMENTS

| | | | |
|---|---|---|---|
| JP | 2003-273829 | | 9/2003 |
| JP | 2004-235916 | | 8/2004 |
| JP | 2004-254290 | | 9/2004 |
| JP | 2005-130485 | | 5/2005 |
| WO | WO 2004/051900 | * | 6/2004 |
| WO | WO 2005078955 A1 * | | 8/2005 |

OTHER PUBLICATIONS

Jun Li et al, "MIMO-OFDM Channel Estimation in the Presence of Carrier Frequency-Offset," Emerging Technologies: Frontiers of Mobile and Wireless Communication, 2004. Proceedings of the IEEE 6th Circuits and Systems Symposium, vol. 2, Jun. 2, 2004, pp. 685-688.

N. Egashira, et al., "Improvement of CCI Compensation Accuracy Using Feedback Phase Tracking in MIMO-OFDM Systems," IEEE Communications Society Global Telecommunications Conference, vol. 2, Dec. 3, 2004, pp. 923-927.

International Search Report dated Mar. 27, 2007.

Yusuke Asai, et al., "MIMO-OFDM Hoshiki ni okeru Iso Zaitsuon Hoseiho ni Kansuru Ichikento" ("A Phase Noise Compensator for MIMO-OFDM System"), The Institute of Electronics, Information and Communication Engineers Zenkoku Taikai, B-5-38, Mar. 8, 2004, p. 525.

Dae-Ki Hong, et al., "Robust Frequency Offset Estimation for Pilot Symbol Assisted Packet CDMA With MIMO Antenna Systems," IEEE Communications Letters, IEEE, vol. 6, No. 6, Jun. 2002, pp. 262-264.

* cited by examiner

WIRELESS COMMUNICATION DEVICE

TECHNICAL FIELD

The present invention relates to a wireless communication apparatus that receives and demodulates signals subjected to spatial-multiplexing transmission using a multicarrier modulation scheme and a multiantenna transmission scheme. More particularly, the present invention relates to a phase compensating technique for compensating for phase rotation due to a residual carrier frequency difference or phase noise.

BACKGROUND ART

Recently, greater capacity and higher speed of wireless communication are increasingly demanded, and a research upon methods of improving the effective use efficiency of limited frequency resources is popular. As one of these methods, a method of utilizing the spatial domain is focused upon. Adaptive array antennas (adaptive antennas) are one of spatial domain utilizing techniques.

This technique adjusts amplitude and phase with a weighting coefficient (hereinafter this weighting coefficient will be referred to as "weight") multiplied upon a received signal. By this means, a desired signal arriving from a desired direction can be received with strong power, so that it is possible to cancel interference component signals such as multipath interference and co-channel interference. As a result of such interference canceling effect, communication capacity of a communication system can be improved.

Further, other techniques utilizing the space domain include a spatial-multiplexing technique of transmitting different data sequences to the same terminal apparatus using physical channels of the same time, the same frequency and the same code by utilizing spatial orthogonality in the channel. The spatial-multiplexing technique is disclosed in, for example, Non-Patent Document 1.

According to the spatial-multiplexing technique, a plurality of antenna elements are provided in a transmitter and a receiver. Further, if the spatial-multiplexing technique is used, it is possible to realize spatial-multiplexing transmission under an environment where correlation between received signals of antennas is little.

In this case, different data sequences are transmitted using physical channels of the same time, the same frequency and the same code between antenna elements, from a plurality of antennas provided in the transmitter. The receiver demultiplexes received signals received at a plurality of antennas based on channel characteristic estimation values.

By this means, higher speed is realized by using a plurality of spatial-multiplexing channels without using M-ary modulation. When spatial-multiplexing transmission is carried out, under an environment where there are a plurality of scatterings between a transmitter and a receiver with a condition where the S/N (signal to noise ratio) is sufficient, if the transmitter and the receiver have the same number of antennas, it is possible to increase communication capacity in proportion to the number of antennas.

When such spatial-multiplexing transmission is carried out, a multicarrier modulation scheme using orthogonal frequency division multiplexing (OFDM) is generally used because, in the multicarrier modulation scheme, if the multipathdelay of a radio channel is within the guard interval time, channel fluctuation that influences upon each subcarrier is regarded as flat fading, and so multipath equalization processing is not necessary and processing of demultiplexing signals subjected to spatial-multiplexing transmission is reduced.

Here, the multicarrier modulation scheme is a transmission scheme using a plurality of subcarriers. The input data signal to each subcarrier is modulated using M-ary QAM modulation and the like, and a subcarrier signal is obtained. OFDM refers to a multicarrier modulation scheme where frequencies between subcarriers are orthogonal. Further, OFDM refers to collectively converting subcarrier signals of different frequencies into time domain signals using a fast Fourier transform circuit, carrying out a frequency conversion on the time domain signals into the carrier frequency band and transmitting these signals from antennas.

On the other hand, a receiving apparatus carries out a frequency conversion on the signals received at antennas into baseband signals and carries out OFDM demodulation processing. Upon such a frequency conversion operation, phase noise is included in the received signals. Although the carrier frequency difference between a transmitter and a receiver can be reduced by an automatic frequency control (AFC) circuit, the residual carrier frequency difference, which is the component of the carrier frequency difference, remains. When M-ary value QAM is used to modulate subcarriers, data decision is carried out upon demodulation with the absolute phase as a reference using a detection circuit, and so the residual carrier frequency difference remains or detection error occurs upon phase rotation due to phase noise and therefore reception characteristics deteriorate.

As a method of compensating for such phase rotation, phase tracking is generally carried out to transmit a known pilot subcarrier signal from a transmitting apparatus, detect the amount of phase rotation of a pilot subcarrier (PSC) in a receiving apparatus and carry out phase compensation based on this detection result. Further, in the following description, the pilot subcarrier is simply referred to as "PSC."

FIG. 1 shows a configuration example of a transmission frame including pilot subcarrier signals. As shown in FIG. 1, the transmission frame is configured with training signal portion A1, signaling portion A2 and data portion A3. Further, data portion A3 includes pilot subcarrier signal (PSC signals) A4 in a specific subcarrier.

FIG. 2 shows a configuration of a wireless communication apparatus including a phase tracking circuit disclosed in Patent Document 1. In FIG. 2, the wireless communication apparatus carries out the following receiving operation with respect to signals of the transmission frame configuration as shown in FIG. 1 which are transmitted after OFDM modulation. First, automatic gain control (AGC) is carried out in AGC section B1 using a received signal of training signal portion A1, and therefore the received signal level is adjusted to be adequate. Then, the frequency difference is corrected by carrying out automatic frequency control (AFC) in AFC section B2, and FFT processing is carried out in FFT section B3. Then, channel equalizing section B4 calculates a channel estimation value showing a channel fluctuation and carries out channel equalization processing. Then, the signal of signaling portion A2 is detected. The signal of signaling portion A2 includes information of the coding rate of the error correction code and the M-ary modulation value.

Next, subcarrier phase tracking circuit B5 receives the signal of data portion A3 subjected to channel equalization as input and carries out the following operation. First, PSC signal extracting section B6 extracts PSC signal A4 from the equalized subcarrier signal of data portion A3. Then, phase rotation detecting section B7 detects the phase rotation of the subcarrier signal after channel equalization, based on extracted PSC signal A4 and a replica signal of the PSC signal. Phase compensating section B8 compensates for the detected phase rotation with respect to the subcarrier signal of data portion A3 subjected to channel equalization, and outputs the signal to subsequent decoding section B9.

Based on information obtained in signaling portion A2, that is, based on coding modulation information of a transmission stream, decoding section B9 carries out demapping processing for converting a symbol data sequence modulated according to a predetermined modulation scheme into a bit sequence, deinterleaving processing which is reverse processing of interleaving processing on the transmitting side and error correction decoding processing with respect to the bit data sequence, thereby restoring the transmission bit sequence.

By this means, it is possible to compensate for the residual carrier frequency difference due to AFC error or the phase rotation, which changes over time, due to the sampling clock difference in the analogue-to-digital converter (A/D), using phase tracking circuit B5. That is, phase compensation can be carried out following the phase rotation, so that it is possible to carry out synchronous detection stably. By this means, received quality in a wireless communication apparatus can be improved.

Patent Document Japanese Patent Application Laid-Open No. 2001-53712

Non-Patent Document: "Layered space-time architecture for wireless communication in a fading environment when using multi-element antennas," G. J. Foschini, Bell Labs Tech. J., pp. 41-59, Autumn 1996.

DISCLOSURE OF INVENTION

Problems to be Solved by the Invention

By the way, there is the following problem when a conventional phase tracking circuit is applied to spatial-multiplexing transmission.

That is, when the pilot subcarriers transmitted from a plurality of antennas are demultiplexed in the time domain or in the frequency domain and transmitted, the phase rotation fluctuating over time can be detected by demultiplexing and extracting the pilot subcarrier from each antenna and comparing the extracted pilot subcarrier signal with a replica signal using the replica signal of the pilot carrier signal as a phase reference signal, so that it is possible to employ the conventional phase tracking circuit without changing this circuit.

However, if pilot subcarriers are demultiplexed and transmitted in the time domain or in the frequency domain, the frequency or the time domain for transmitting data decreases in proportion to the extracted and transmitted pilot subcarriers, and so there is a drawback that the transmission efficiency decreases.

By contrast with this, as in, for example, a transmission format of FIG. 1, if pilot subcarriers transmitted from a plurality of antennas are not demultiplexed in the time domain or in the frequency domain, that is, pilot subcarriers are spatial-multiplexed, and are transmitted using the same subcarrier in the same OFDM symbol, the transmission efficiency is good.

However, if pilot subcarrier signals are spatial-multiplexed and transmitted, pilot subcarrier signals transmitted from a plurality of antennas receive different channel responses, and are mixed and received, and so replica signals of pilot subcarrier signals cannot be used as phase reference signals. For this reason, there is a problem that the phase rotation cannot be detected in a conventional tracking circuit.

As one method for solving the above problem, a method of carrying out inverse matrix operation using a channel estimation value and demultiplexing a received spatial-multiplex pilot subcarrier signal to a pilot subcarrier signal transmitted from each transmitting antenna, is possible. However, this method requires complicated circuits for carrying out inverse matrix operation, and so there is a drawback that the configuration becomes complicated.

It is therefore an object of the present invention to provide a wireless communication apparatus that enables phase difference detection and phase compensation even in a case where pilot subcarrier signals are spatial-multiplexed and transmitted, with a simple configuration.

Means for Solving the Problem

An aspect of the wireless communication apparatus according to the present invention employs a configuration including: a reference signal generating section that generates a spatial-multiplex pilot subcarrier signal as a reference signal; a spatial-multiplex pilot subcarrier extracting section that extracts the spatial-multiplex pilot subcarrier signal from a received signal subjected to multicarrier modulation; and a phase compensating section that detects and compensates for a phase difference of the received signal by comparing the reference signal obtained by the reference signal generating section with the spatial-multiplex pilot subcarrier signal obtained by the spatial-multiplex pilot subcarrier extracting section.

ADVANTAGEOUS EFFECT OF THE INVENTION

According to the present invention, by preparing in advance a reference signal matching a received spatial-multiplex pilot subcarrier signal and comparing at the phase compensating section the reference signal with a spatial-multiplex pilot subcarrier signal actually received, the phase difference of the spatial-multiplex pilot subcarrier signal actually received is detected and the phase difference is compensated for, so that phase difference detection and phase compensation can be carried out even in a case where pilot subcarrier signals are spatial-multiplexed and transmitted, with a simple configuration.

BEST MODE FOR CARRYING OUT THE INVENTION

Embodiments of the present invention will be described in detail below with reference to accompanying drawings.

Embodiment 1

Figure 1:
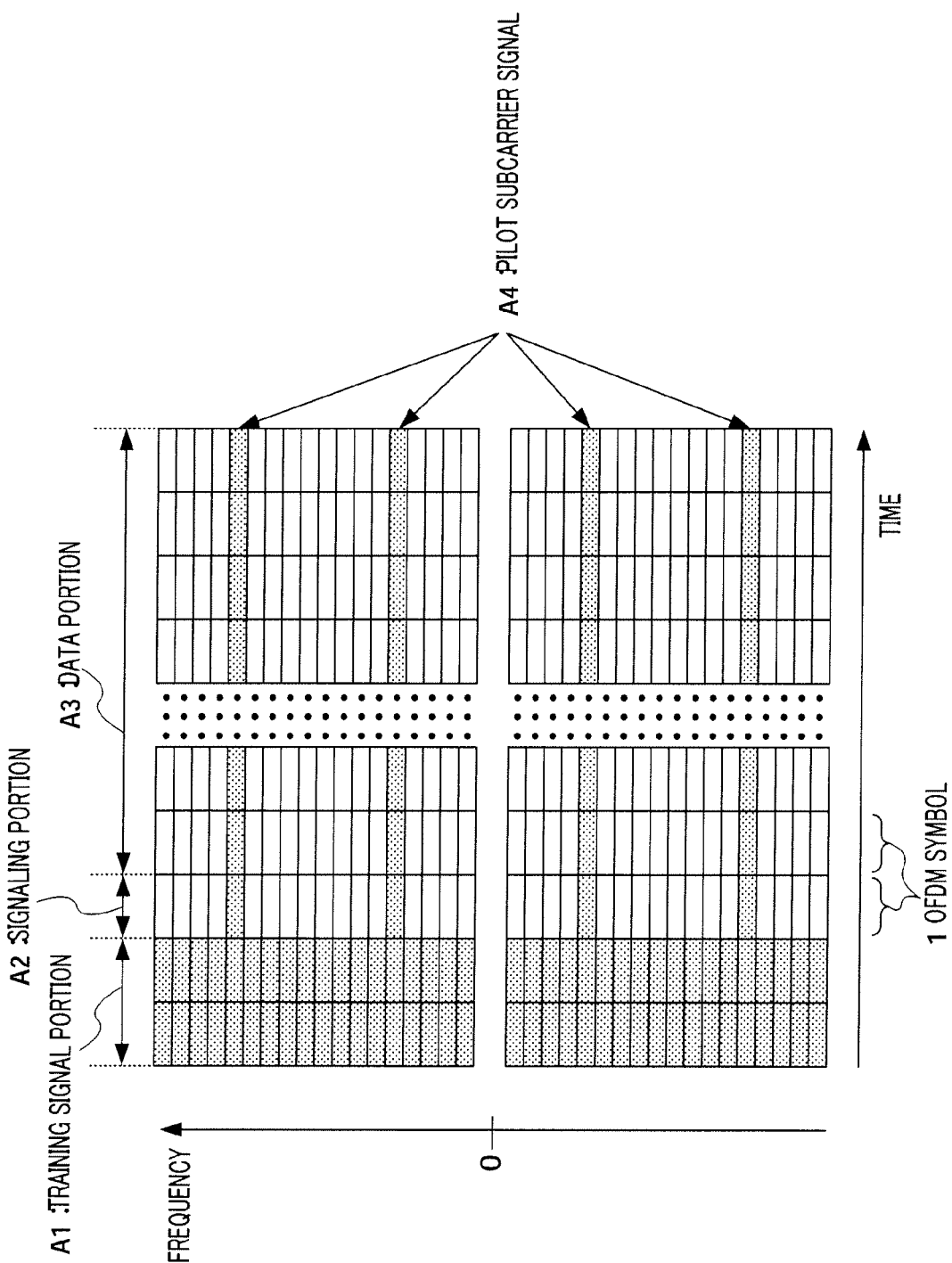
FIG. 1 shows an example of a transmission format for spatial-multiplexing and transmitting pilot subcarrier signals.
Figure 2:
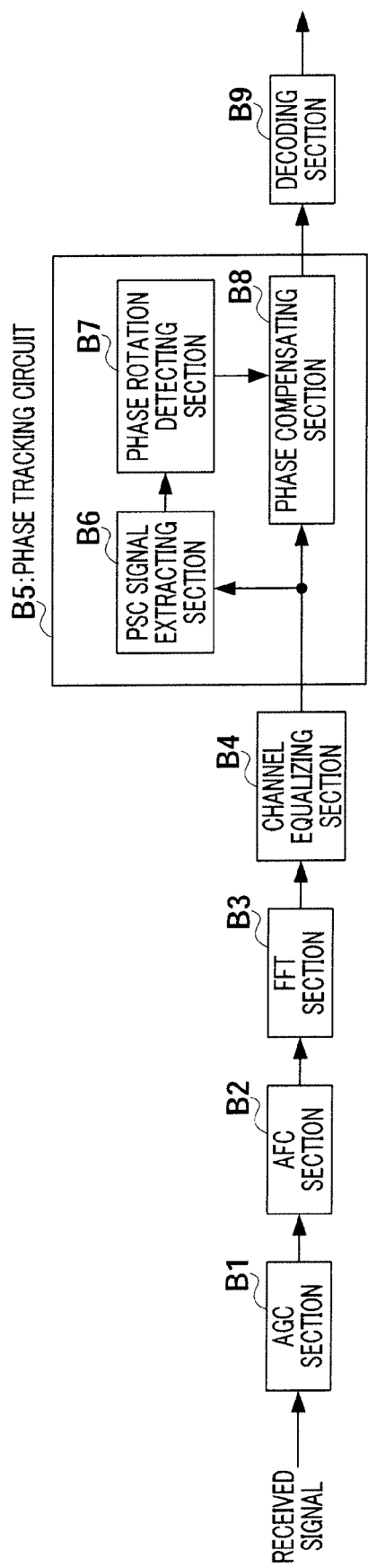
FIG. 2 is a block diagram showing a configuration example of a conventional wireless communication apparatus including a phase tracking circuit.
Figure 3:
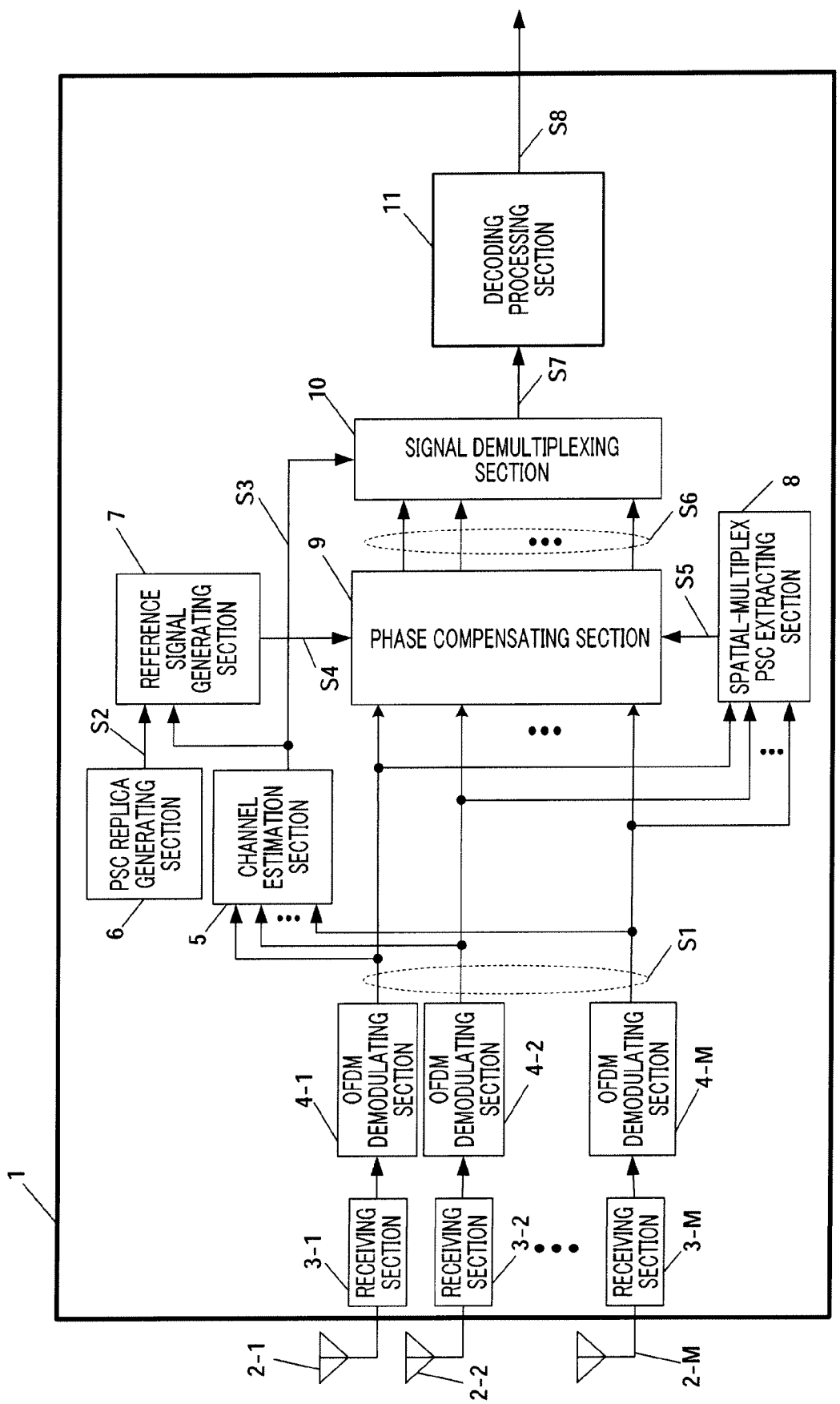
FIG. 3 is a block diagram showing a configuration of a wireless communication apparatus according to Embodiment 1 of the present invention.
Figure 4:
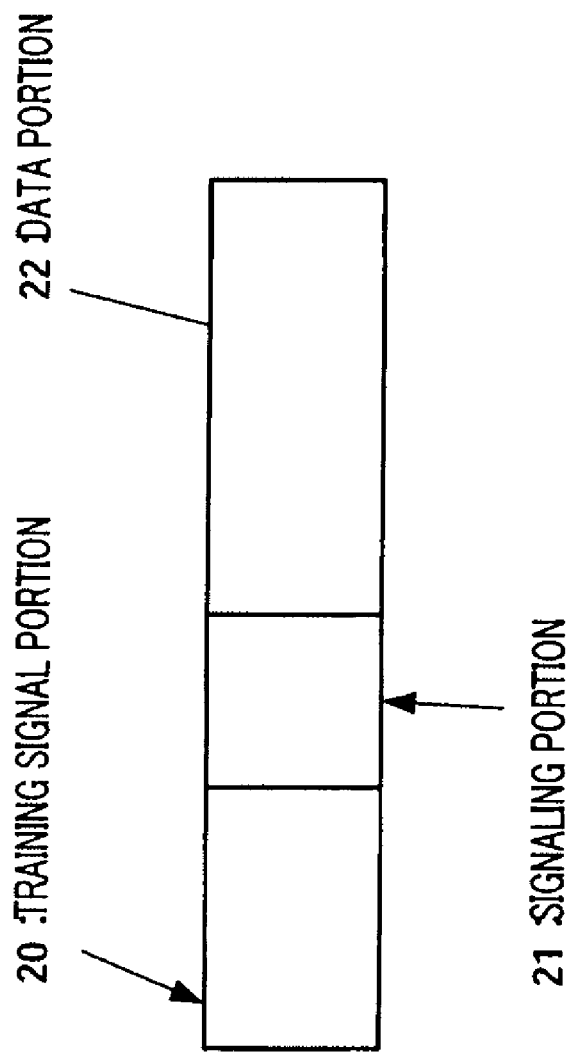
FIG. 4 shows a configuration example of a packet according to embodiments.

FIG. 3 shows a configuration of wireless communication apparatus 1 according to Embodiment 1 of the present invention. With the present embodiment, a configuration of receiving sections of wireless communication apparatus 1 using OFDM as a multicarrier transmission scheme will be described. Further, OFDM modulation and OFDM demodulation are known techniques disclosed in, for example, the document "OFDM system technique and MATLAB simulation explanation," Ochi, published by TRICEPS, and the detailed explanation will be omitted. Further, wireless communication apparatus 1 shows only a configuration of the receiving system and a configuration of the transmitting system is not shown. Further, the following description assumes packet transmission used in, for example, the wireless LAN. FIG. 4 shows a configuration example of a packet.

In FIG. 4, a packet is configured with training signal portion 20 configured with a known signal sequence, signaling portion 21 and data portion 22. The training signal in training signal portion 20 is used for automatic gain control (AGC) upon amplification processing, frequency synchronization, symbol timing synchronization and channel distortion equalization in receiving sections 3-1 to 3-M. Signaling portion 21 includes information of the unique identification signals for wireless communication apparatuses 1 which are the transmission source and transmission destination of subsequent data portion 22, the coding rates for the error correction codes and the M-ary modulation values.

OFDM demodulating sections 4-1 to 4-M carry out OFDM modulation on each inputted baseband signal by carrying out time synchronization processing, frequency synchronization processing, GI (guard interval) removal, IFFT (Inverse Fast Fourier Transform) and serial-to-parallel conversion, and outputs a symbol data sequence of Nc subcarriers as OFDM demodulated signal S1.

In the following description, upon reception of the k-th OFDM symbol from the time reception starts, the symbol data sequence of the fs-th subcarriers is represented by Y(k, fs). Here, Y (k, fs) is a column vector including signals received at M antennas 2-1 to 2-M used for reception, as elements. That is, signal $y_m$(k, fs) outputted from OFDM demodulating section 4-$m$ that receives as input the signal received at antenna 2-$m$, is the m-th element. Here, k=1 to Ng, and fs=1 to Nc. Here, Ng is the number of OFDM symbols of data portion 22 in a transmitted packet signal. Further, Nc subcarriers in data portion 22 include Nd data subcarriers and Np pilot subcarriers which are known signals for phase rotation detection. Here, Nd+Np=Nc.

Channel estimation section 5 estimates channel fluctuation in each subcarrier as the complex amplitude including the amplitude fluctuation and phase rotation, by using the signal of training signal portion 20 included in the preamble (training signal portion 21+signaling portion 21) of a transmitted packet (hereinafter this estimation value will be referred to as "channel estimation value").

Here, if, in a wireless communication apparatus with a plurality of transmitting antennas on the transmitting side, spatial-multiplexing transmission for transmitting Nt spatial-multiplex streams is carried out using a plurality of transmitting antennas, transmitting sequence vector X(k, fs) including transmitting sequence $x_n$ (k, fs) of the fs-th subcarrier in the k-th OFDM symbol transmitted from each transmitting antenna as elements is represented by X(k, fs)=$[x_1(k, fs), \ldots, x_{Nt}(k, fs)]^T$. Here, the superscript T is a vector transposition operator.

As long as the relative delay time from the advancing wave of multipath on a channel is in the range of the guard interval (GI), even if the radio channel is under an environment of frequency selective fading, the radio wave channel is assumed to be under an environment of flat fading transmission in subcarrier units. In this case, wireless communication apparatus 1 is able to carry out frequency synchronization under an ideal condition, received signal vector Y(k, fs) of subcarrier fs receiving the k-th OFDM symbol when there is no jitter of the sampling clock between the transmitter and the receiver, is represented by the following equation.

[1]

$$Y(k,f_s)=H(k,f_s)X(k,f_s)+n(k,f_s) \quad \text{(Equation 1)}$$

Here, Y(k, fs) is a column vector including the received signals of M antennas 2-1 to 2-M used for reception as elements, and have signal $y_m$(k, fs) of subcarrier fs received at antenna 2-$m$ as the m-th element. Further, H(k, fs) is a channel response matrix showing the channel fluctuation which influences upon transmission sequence X (k, fs) in the channel.

Here, H(k, fs) is a matrix configured with (the number of receiving antennas M of wireless communication apparatus 1) columns×(the number of transmitting antennas Nt in the wireless communication apparatus on the transmitting side) rows. In H (k, fs), matrix element $h_{ij}$ of the i-th column and the j-th row shows channel fluctuation when signal $X_j$(k, fs) transmitted from the j-th transmitting antenna in the wireless communication apparatus on the transmitting side is received at i-th antenna 2-$i$ in wireless communication apparatus 1 on the receiving side.

Further, n(k, fs) is a noise component vector of subcarrier fs which is each added to subcarrier fs upon reception at M receiving antennas 2 of wireless communication apparatus 1. Under a condition where channel fluctuation is sufficiently moderate, processing of detecting (signal demultiplexing and equalization processing) received signals, which are spatial-multiplexed and transmitted, can be carried out using channel estimation value $H_e$(fs) which is a result of estimating channel fluctuation H(k, fs) in the preamble portion by channel estimation section 5.

On the other hand, if a difference (residual carrier frequency difference Δfc) due to frequency synchronization processing in receiving section 3 is included or if a jitter (sampling clock difference Δfa) of the sampling clock is included between the transmitter and the receiver, these differences cause phase rotation. In this case, received signal vector Ye(k, fs) of subcarrier fs is represented by the following equation.

[2]

$$Y_e(k,f_s) = E(k,f_s)H(k,f_s)X(k,f_s) + n(k,f_s) \quad \text{(Equation 2)}$$

Here, phase rotation matrix E(k, fs) is represented by the following equation.

[3]

$$E(k,f_s) = \exp[j2\pi k(\Delta f_c T_s + pos(f_s)\Delta f_a T_e/N_{FFT})]I_M \quad \text{(Equation 3)}$$

Here, Ts is the OFDM symbol length and Te is the time interval obtained by subtracting the GI time from the OFDM symbol length. Further, POS (fs) is the number representing the subcarrier position of the fs-th subcarrier, and, based on the subcarrier number 0 corresponding to the direct current component, + (plus) is the positive domain and − (minus) is the negative domain. Further, the wireless communication apparatus on the transmitting side and wireless communication apparatus 1 on the receiving side assume configurations of carrying out a frequency conversion at a plurality of antennas using local oscillators of the same characteristics. Further, $N_{FFT}$ is the number of subcarriers (FFT size) for carrying out FFT processing and $I_M$ is a unit matrix of order M.

As described above, as represented by equation 2, in wireless communication apparatus 1, even if channel fluctuation is sufficiently moderate, a signal with the phase rotation for each OFDM symbol is received, and so, when the processing of demapping symbol data is carried out according to synchronous detection, a mechanism for compensating for the phase rotation is required.

Pilot subcarrier (PSC) replica generating section 6 generates pilot subcarrier replica signal $X_{PSC}$ (m, fs) (S2 of FIG. 3) transmitted using a specific subcarrier (hereinafter the fn-th subcarrier in the m-th OFDM symbol).

As represented by the following equation, reference signal generating section 7 generates reference signal $S_{PSC}$ (m, fs) (S4 of FIG. 3) using channel estimation signal $H_e$ (fn) (S3 of FIG. 3) obtained by channel estimation section 5 and pilot subcarrier replica signal S2 obtained by PSC replica generating section 6.

[4]

$$S_{psc}(m,f_n) = H_e(f_n)X_{PSC}(m,f_n) \quad \text{(Equation 4)}$$

In this way, reference signal generating section 7 generates reference signal $S_{PSC}$(m, fn) corresponding to a received signal where pilot subcarrier $X_{PSC}$(m, fn) subjected to spatial-multiplexing transmission using the fn-th subcarrier signal in the m-th OFDM symbol is influenced by channel fluctuation without phase rotation due to phase rotation E.

Spatial-multiplexing pilot subcarrier (PSC) extracting section 8 extracts pilot subcarrier signal Ye(m, fs) (S5 of FIG. 5) represented by the following equation and subjected to spatial-multiplexing transmission using a specific subcarrier (the fn-th subcarrier in the m-th OFDM symbol), from received signal Ye(k, fs) represented by equation 2.

[5]

$$Y_e(m,f_n) = E(m,f_n)H(m,f_n)X_{PSC}(m,f_n) + n(m,f_n) \quad \text{(Equation 5)}$$

Phase compensating section 9 carries out phase tracking for detecting a phase rotation of pilot subcarrier signal S5 using reference signal S4 from reference signal generating section 7 and pilot subcarrier signal S5 from spatial-multiplexing PSC extracting section 8 and compensating for the phase difference due to residual carrier frequency difference Δfc and sampling clock difference Δfa using the phase rotation. To be more specific, as represented by the following equation, the phase rotation is detected by detecting phase rotation $E_{est}$(m, fn) of pilot subcarrier signal S5 (Ye (m, fn)) with reference signal S4 ($S_{PSC}$ (m, fn)) as a reference point.

[6]

$$E_{est}(m,f_n) = \text{angle}[Y_e(m,f_n)] - \text{angle}[S_{PSC}(m,f_n)] \quad \text{(Equation 6)}$$

Here, angle [x] is an operator for calculating the phase of variable x in a complex number.

For residual carrier frequency difference Δfc, phases rotate by the same amount in the same OFDM symbol, and so, as represented by the following equation, phase difference Lc(m) is determined by calculating a phase obtained by weighting and averaging pilot subcarriers fn included in the same OFDM symbol based on common phase rotations $E_{est}$(m, fn) detected in subcarriers to correct residual carrier frequency difference Δfc based on phase difference Lc(m).

[7]

$$L_c(m) = \sum_{f_n \in PSC(m)} a(f_n) E_{est}(m, f_n) \quad \text{(Equation 7)}$$

Here, a(fn) is a diagonal matrix of order M (elements other than the diagonal components are zero) satisfying the following equation. Weighting is carried out using the weighting coefficients assigned in proportion to the received power or the received amplitude of subcarrier signal Ye(m, fs). Further, PSC(m) is the subcarrier number of the pilot subcarrier included in the m-th OFDM symbol.

[8]

$$\sum_{f_n \in PSC(m)} a(f_n) = I_M \quad \text{(Equation 8)}$$

Further, the following equation can be applied as another method for calculating phase difference Lc(m). In this case, phase rotations detected in a plurality of pilot subcarriers are weighted in proportion to the received power and combined. Here, the symbol ".*" in equation 9 represents multiplication carried out per element which is at the same position of a vector.

[9]

$$L_c(m) = \text{angle}\left[\sum_{f_n \in PSC(m)} Y_e(m, f_n) \cdot * S^*_{PSC}(m, f_n)\right] \quad \text{(Equation 9)}$$

Sampling clock difference Δfa is estimated as the amount of phase rotation Ls(m, fn) in the time domain by comparing the phase rotation between pilot subcarriers in the same subcarriers in different OFDM symbols.

Further, upon calculation of phase difference Lc(m) according to equation 7 or equation 9, weighting may be carried out according to the phase relationship in pilot subcarrier replica signal $X_{PSC}$(m, fn).

For example, when spatial-multiplexing transmission is carried out using two transmitting antennas, if pilot subcarrier replica signal $X_{PSC}$(m, fn) of the n-th subcarrier in the m-th OFDM symbol has the same elements (that is, if in-phase signals are transmitted from different antennas), the weighting coefficient is decreased.

On the other hand, if pilot subcarrier replica signals $X_{PSC}$(m, fn) have elements with inverted codes (that is, if out-of-phase signals are transmitted from different antennas), the weighting coefficient is increased.

In this way, the weighting coefficient for a phase difference is changed based on the phase relationship in the spatial-multiplex pilot subcarrier signal in phase compensating section 9, so that it is possible to further increase phase tracking performance.

This is because if a preamble signal for channel estimation is configured with a plurality of OFDM symbols, the channel estimation value reflects a phase difference to the extent that the phase difference cannot be ignored if residual AFC error is significant, which causes deterioration of phase tracking performance. However, by adding the above weighting processing, it is possible to reduce deterioration in phase tracking performance.

As represented by the following equation, phase compensating section 9 compensates for the phase rotation difference by multiplying received signal vector Ye (k, fs) of subcarrier fs of data portion 22 by the phase rotation for correcting the amount of phase rotation L (k, fs)=Lc(k)+Ls(k, fs) for each OFDM symbol or for each subcarrier calculated as described above.

[10]

$$Z(k, f_s) = \begin{pmatrix} \exp(-jL^1(k, f_s)) & 0 & \cdots & 0 \\ 0 & \exp(-jL^2(k, f_s)) & \ddots & \vdots \\ \vdots & \ddots & \ddots & 0 \\ 0 & \cdots & 0 & \exp(-jL^M(k, f_s)) \end{pmatrix} Y_e(k, f_s) \quad \text{(Equation 10)}$$

Further, L(k, fs) is a vector of order M including the amount of phase rotation $L^r$(k, fs) of each branch as the r-th element, and the amount of phase rotation calculated by this equation per branch is applied.

As another method, a method of detecting and compensating for the common phase rotations in all branches by further averaging the amounts of phase rotation $L^r$(k, fs) of branches may be employed.

The former compensating method enables receiving performance with little characteristics deterioration if local oscillators of different characteristics are used in a frequency conversion section on the transmitting side or in receiving sections on the receiving side, or if antenna directionality varies between antennas and received signals receive different Doppler fluctuations.

On the other hand, the latter compensating method enables improvement in the effect of averaging the amounts of phase rotation of branches received at a plurality between antennas and improvement in the performance of detecting the amount of phase rotation at, particularly, lower SNR. Further, phase compensation according to interpolation processing using the amounts of preceding and subsequent phase rotations is carried out with respect to an OFDM symbol without a pilot subcarrier.

Signal demultiplexing section 10 demultiplexes a spatial-multiplex stream subjected to spatial-multiplexing transmission by carrying out signal demultiplexing processing on output S6 of phase compensating section 9 using channel estimation signal S3. Processing of demultiplexing a spatial-multiplex stream is disclosed in, for example, Non-Patent Document 1, and so will not be described here. For example, when a spatial-multiplex stream is demultiplexed according to the ZF (Zero Forcing) method, as represented by the following equation, transmission symbol sequence $X_d$(k, fs) is demultiplexed by calculating the inverse matrix of channel estimation value He(fs) for each subcarrier obtained in channel estimation section 5. Further, the demultiplexing processing in signal demultiplexing section 10 is not limited to the ZF method and may employ other methods such as the MMSE (Minimum Mean Square Error) method and the MLD (Maximum Likelihood Detection).

[11]

$$X_d(k, f_s) = H_e(f_s)^{-1} Z(k, f_s) \quad \text{(Equation 11)}$$

Decoding processing section 11 reads information of signaling portion 21 from demultiplex signal S7 outputted from signal demultiplexing section 10 and detects coding modulation information of the transmission stream. Based on this coding modulation information, decoding processing section 11 carries out demapping processing for converting a symbol data sequence obtained by modulating data portion 22 of demultiplex signal S7 according to a predetermined modulation scheme into a bit data sequence, deinterleaving processing which is reverse processing of interleaving processing on the transmitting side and error correction decoding processing on the bit data sequence. By this means, decoding processing section 11 restores a transmission bit sequence. In this way, decoding processing section 11 obtains decoded data S8.

As described above, according to the present embodiment, spatial-multiplex pilot subcarrier (PSC) extracting section 8 that extracts known spatial-multiplex pilot subcarrier signal S5 from a received signal subjected to multicarrier modulation, reference signal generating section 7 that generates reference signal S4 of the spatial-multiplex pilot subcarrier signal and phase compensating section 9 that compensates for the phase difference of received signal S1 based on pilot subcarrier signal S5 and reference signal S4 extracted by spatial-multiplex pilot subcarrier extracting section 8 are provided, so that it is possible to realize wireless communication apparatus 1 that, even in a case where the pilot subcarrier signal is spatial-multiplexed and transmitted, enables phase compensation with a simple configuration without dedicated circuitry for demultiplexing the pilot subcarrier signal.

Further, spatial-multiplex pilot subcarrier replica generating section 6 that generates a replica of the spatial-multiplex pilot subcarrier signal and channel estimation section 5 that calculates channel estimation value S3 of the pilot subcarrier using the known pilot signal are provided, and the signal obtained by adding channel fluctuation of channel estimation value S3 to spatial-multiplex pilot subcarrier replica signal S2 is made reference signal S4, so that it is possible to obtain only reference signal S4 influenced by channel fluctuation without phase rotation. As a result, phase compensating section 9 compares reference signal S4 with actual spatial-multiplex pilot subcarrier signal S5 extracted from spatial-multiplex pilot subcarrier extracting section 8, and, consequently, is able to detect the phase rotation accurately.

Further, although a case has been described with the present embodiment where phase compensating section 9 carries out phase compensation for an output of OFDM demodulating section 4, phase compensation may be carried out for channel estimation value S3.

Figure 5:
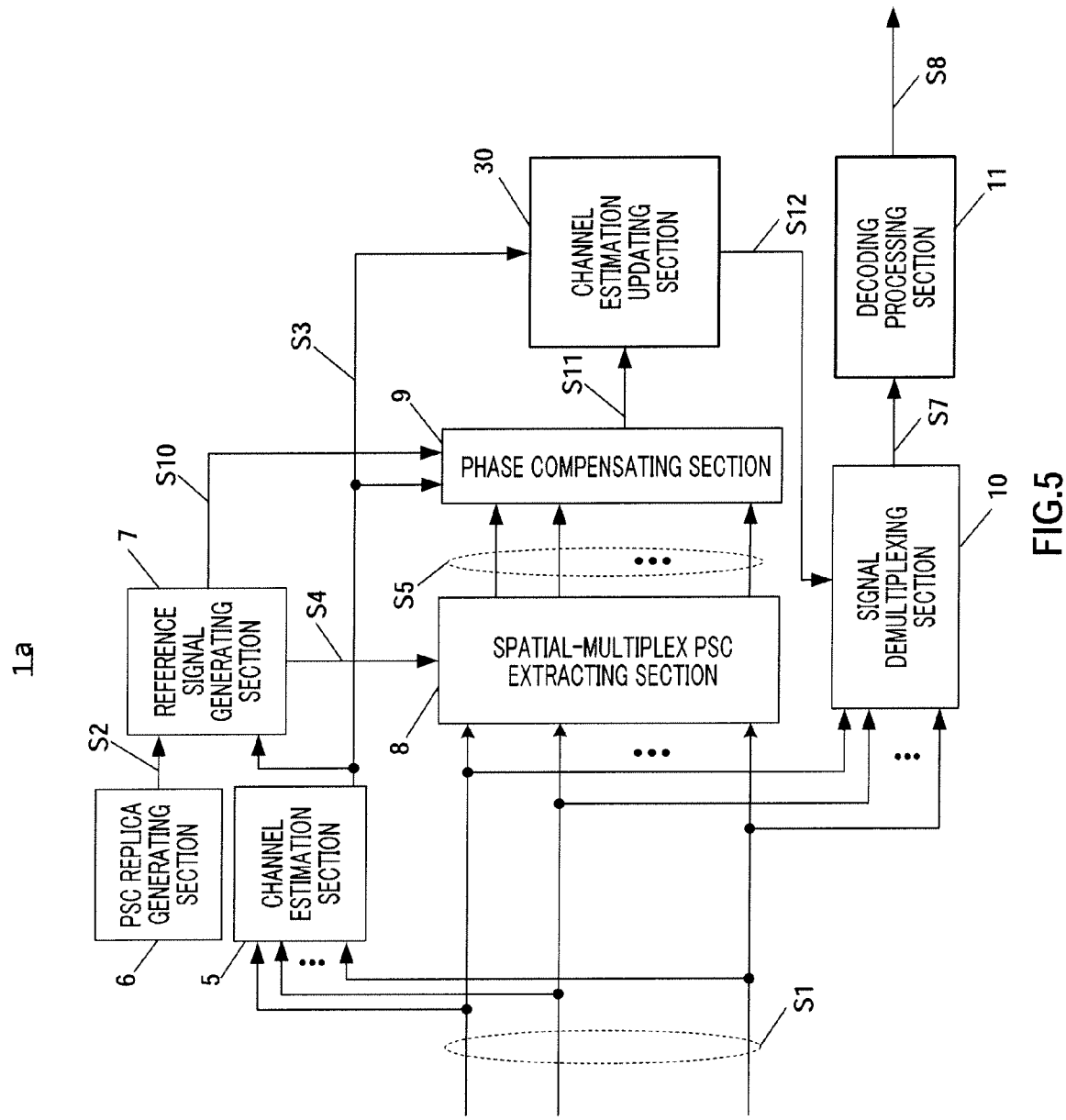
FIG. 5 is a block diagram showing another configuration example of the wireless communication apparatus according to Embodiment 1.

FIG. 5 shows a configuration example of wireless communication apparatus 1a for carrying out such processing, and, in FIG. 5, the same component are assigned the same reference numerals as in FIG. 3. Further, in FIG. 5, receiving sections 3-1 to 3-M and OFDM demodulating sections 4-1 to 4-M of FIG. 3 are omitted. In FIG. 5, wireless communication apparatus 1a has channel estimation updating section 30. Wireless communication apparatus 1a inputs output S11 of phase compensating section 9 and output S3 (channel estimation value) of channel estimation section 5, to channel estimation updating section 30. Channel estimation updating section 30 updates channel estimation value S3 for each subcarrier and each OFDM symbol based on output value S11 of phase compensating section 9. That is, as represented by the following equation, channel estimation updating section 30 calculates channel estimation value Hb (k, fs) by multiplying channel estimation value He(fs) for each subcarrier obtained by channel estimation section 5 by the amount of phase rotation L(k, fs).

[12]

$$H_b(k, f_s) = \begin{pmatrix} \exp(-jL^1(k, f_s)) & 0 & \cdots & 0 \\ 0 & \exp(-jL^2(k, f_s)) & \ddots & \vdots \\ \vdots & \ddots & \ddots & 0 \\ 0 & \cdots & 0 & \exp(jL^M(k, f_s)) \end{pmatrix} H_e(f_s)$$

(Equation 12)

Output S12 of channel estimation value updating section 30 is outputted to signal demultiplexing section 10. Signal demultiplexing section 10 carries out processing of demultiplexing (detection processing) a spatial-multiplex stream based on updated channel estimation value Hb(k, fs).

According to the configuration of FIG. 5, it is possible to obtain the same effect as the configuration of FIG. 3. However, in case where the configuration of FIG. 5 is used, channel estimation value S3 is changed per OFDM symbol. Therefore, if processing of demultiplexing the spatial-multiplex stream is carried out at signal demultiplexing section 10 using the ZF method or the MMSE method, channel estimation value Hb varies between OFDM symbols, and so it is necessary to carry out inverse matrix operation per OFDM symbol.

On the other hand, according to the configuration of FIG. 3, channel estimation value S3 varies between subcarriers but is common between all OFDM symbols, and so carrying out inverse matrix operation once with respect to subcarriers once is sufficient, so that it is possible to reduce the amount of calculation and processing delay. Further, similarly, according to the configuration of FIG. 3, when signal processing section 10 carries out demultiplexing processing using the MLD method, channel estimation value He(fs) is common between all OFDM symbols as represented by the following equation, and so it is not necessary to carry out an operation per OFDM symbol on candidate point Xs of a symbol data sequence for each subcarrier upon spatial-multiplexing. As a result, it is possible to reduce the amount of processing and processing delay.

[13]

$$H_e(fn)X_s$$ (Equation 13)

Further, the configuration of the present embodiment includes carrying out phase compensation for OFDM demodulated signal S1 of each subcarrier or carrying out phase compensation for channel estimation value S3, and does not depend on the configuration of signal demultiplexing section 10. For this reason, the method of demultiplexing spatial-multiplex streams in signal demultiplexing section 10 may be adaptively changed. That is, it is possible to use the MLD method when the M-ary modulation value is small and use the ZF method when the M-ary modulation value such as 64 QAM is large to reduce the circuit scale for 64 QAM.

Embodiment 2

Figure 6:
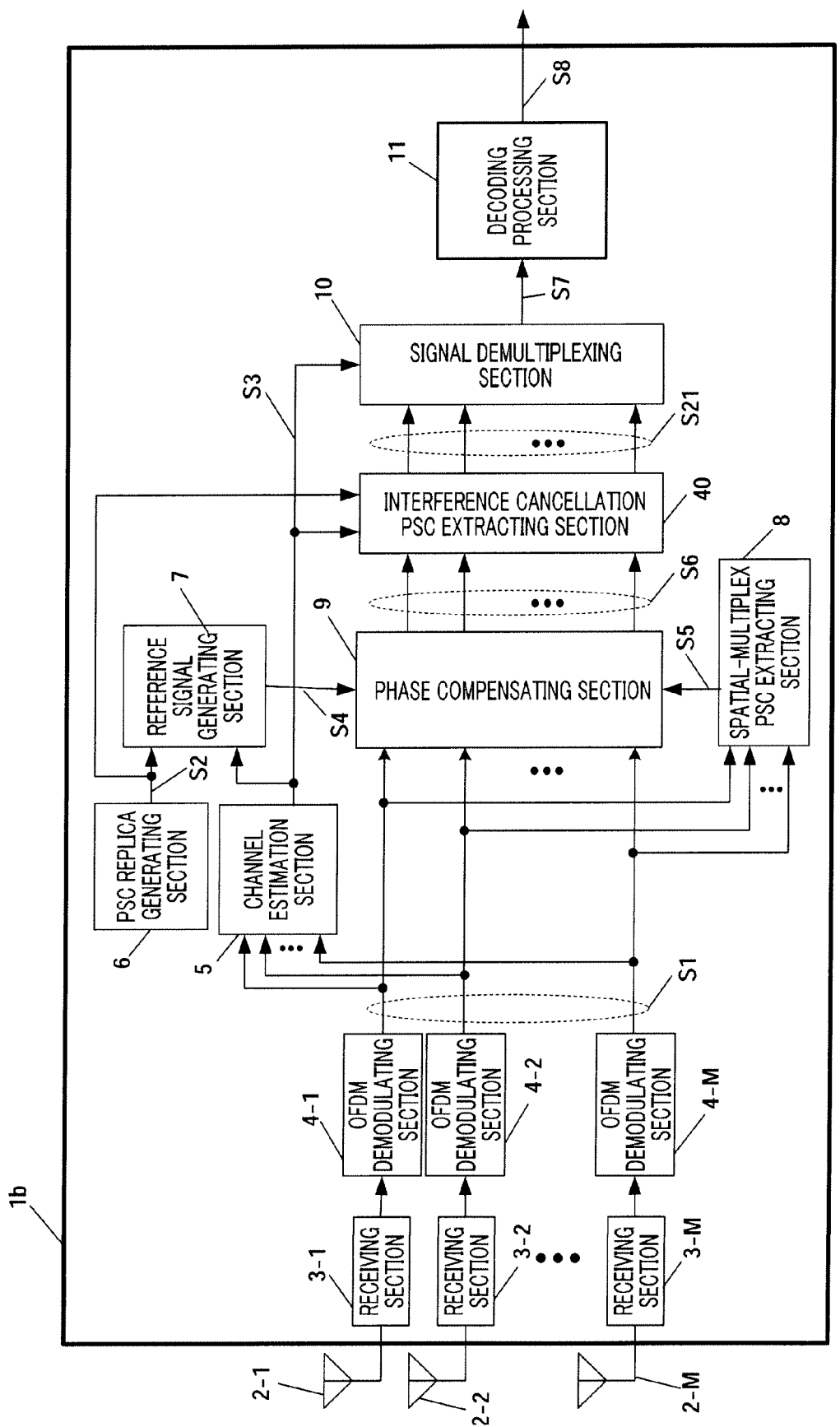
FIG. 6 is a block diagram showing a configuration of the wireless communication apparatus according to Embodiment 2.

FIG. 6 show a configuration of the wireless communication apparatus according to Embodiment 2, and, in FIG. 6, the same components as in FIG. 3 are assigned the same reference numerals. Similar to FIG. 3, FIG. 6 shows only a configuration for reception in wireless communication apparatus 1b, and the illustration of the configuration for transmission is omitted.

Wireless communication apparatus 1b of the present embodiment differs from Embodiment 1 in having interference cancellation PSC phase compensating section 40 subsequent to phase compensating section 9.

Interference cancellation PSC phase compensating section 40 receives inputs of subcarrier signal Z (m, fs) (S6 in FIG. 6) in which the phase rotation is compensated for by phase compensating section 9 and which is represented by equation 10, pilot subcarrier replica signal S2 outputted from PSC replica generating section 6 and channel estimation signal S3 outputted from channel estimation section 5, and removes a phase difference that cannot be canceled by phase compensating section 9.

Figure 7:
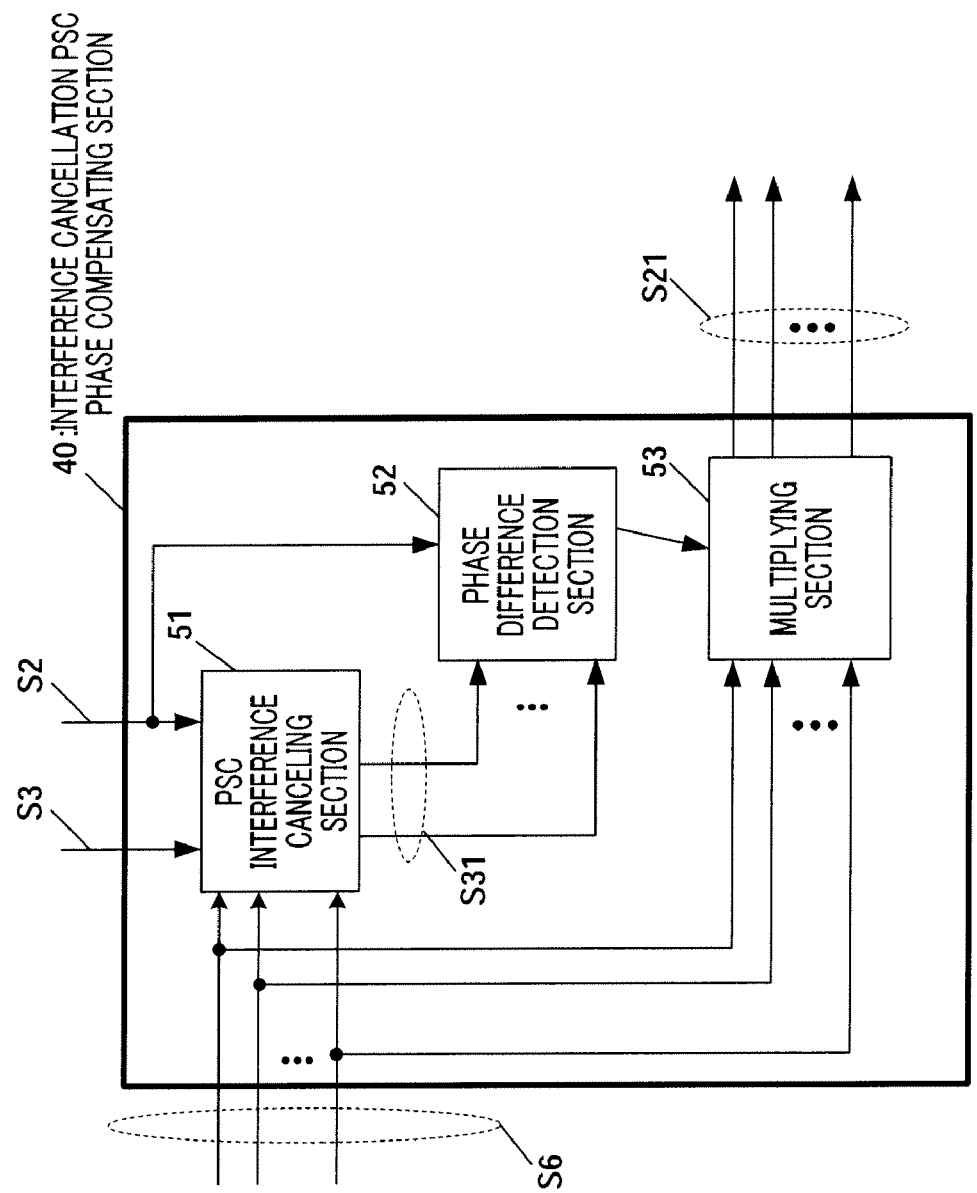
FIG. 7 is a block diagram showing a configuration of an interference cancellation pilot subcarrier (PSC) phase compensating section.

FIG. 7 shows a detailed configuration of interference cancellation PSC phase compensating section 40. PSC interference canceling section 51 extracts pilot subcarrier component $Z_{PSC}$(m, fn) in output S6 subjected to phase compensation in phase compensating section 9, cancels spatial-multiplex PSCs other than the desired r-th PSC by regarding the other spatial-multiplex PSCs as interference signals, and outputs signal $v_r$(m, fn) (S31 of FIG. 31) obtained by performing maximum ratio combination on results of receiving the r-th PSC after interference cancellation at a plurality of antennas. That is, $v_r$(m, fn) is calculated as represented by the following equation.

[14]

$$v_r(m,f_n) = h_r(f_n)^T [Z_{PSC}(k,f_n) - H_e(f_n) G_r X_{PSC}(m,f_n)]$$ (Equation 14)

Here, $h_r$(fn) is the r-th column vector in channel estimation value He(fs) of the fn-th subcarrier, the superscript T is the vector transposition operator and Gr is a matrix where diagonal components of the r-th row and the r-th column in the unit matrix of order Nt is made zero. Further, r takes positive values between 1 and Nt. Interference cancellation PSC phase compensating section 40 carries out the above operation of interference cancellation with respect to all of spatial-multiplex streams Nt.

Phase difference detecting section 52 detects the phase rotation of signal $v_r(m, fn)$ after interference cancellation, with pilot subcarrier replica signal S2 outputted from PSC replica generating section 6 as a reference. As represented by the following equation, phase rotation $E^r_{est}(m, fn)$ of signal $v_r(m, fn)$ after interference cancellation, is calculated with pilot subcarrier signal $X^r_{PSC}(m, fn)$, which is transmitted using a specific subcarrier (the fn-th subcarrier in the m-th OFDM symbol) in the r-th spatial-multiplex stream, as a reference.

[15]

$$E^r_{est}(m,f_n) = \text{angle}[v_r(m,f_n)] - \text{angle}[X^r_{PSC}(m,f_n)] \quad \text{(Equation 15)}$$

Here, angle[x] is an operator for calculating the phase of variable x in a complex number.

Phase difference detecting section 52 carries out the following difference detection on common phase rotations $E_{est}$ (m, fn) detected in subcarriers if residual carrier frequency difference can be regarded as $\Delta fc$. That is, residual carrier frequency difference $\Delta fc$ is added a phase rotation which is common in the same OFDM symbol, and so, as represented by the following equation, phase difference Lc (m) is determined by calculating a phase obtained by weighting and averaging pilot subcarriers (fn) included in the same OFDM symbol with respect to detected phase rotation $E_{est}$ (m, fn).

[16]

$$L_c(m) = \sum_{fn \in PSC(m)} a(f_n) E_{est}(m, f_n) \quad \text{(Equation 16)}$$

Here, a(fn) is a diagonal matrix of order M satisfying equation 8 (elements other than diagonal components are zero). Weighting is carried out by assigning the weighting coefficients in proportion to the received power or the received amplitude of signal $v_r(m, fn)$ from which interference is cancelled. Further, PSC(m) is the subcarrier number of the pilot subcarrier included in the m-th OFDM symbol.

Further, the method of phase difference detection is not limited to this, detection of a phase difference due to the sampling clock difference varying between subcarriers may be carried out.

Further, as another method of calculating phase difference Lc(m), the following equation can be applied.

[17]

$$L_c(m) = \text{angle}\left[\sum_{fn \in PSC(m)} v(m, f_n) \cdot * X^*_{PSC}(m, f_n)\right] \quad \text{(Equation 17)}$$

In this case, the phase rotations detected in a plurality of pilot subcarriers are weighted in proportion to the received power and combined. Here, the symbol ".*" represents multiplication carried out per element which is at the same position of a vector. Further, v(m, fn) is a column vector of order M configured with signal $v_r(m, fn)$ from which interference is cancelled as the r-th element.

As in the following equation, multiplying section 53 carries out phase compensation using phase difference Lc(k) obtained by phase difference detecting section 52.

[18]

$$U(k, f_s) = \begin{pmatrix} \exp(-jL_c^1(k)) & 0 & \cdots & 0 \\ 0 & \exp(-jL_c^2(k)) & \ddots & \vdots \\ \vdots & \ddots & \ddots & 0 \\ 0 & \cdots & 0 & \exp(-jL_c^{(M)}(k)) \end{pmatrix} Z(k, f_s) \quad \text{(Equation 18)}$$

Further, equation 18 shows the amount of phase rotation Lc(r) (k, fs) of each branch, and the value calculated by this equation may be applied to each branch. Further, a method of detecting and compensating for common phase rotations in all branches by averaging the values of branches may be applied.

The former compensating method enables receiving performance that reduces characteristic deterioration in the wireless communication apparatus having a configuration that utilizes local oscillators of different characteristics in the frequency conversion section on the transmitting side or the receiving section on the receiving side. Further, the former compensating method enables received performance that reduces characteristic deterioration when antenna directionality varies between antennas and the received signals are influenced by different Doppler fluctuations.

On the other hand, the latter compensating method enables improvement in the effect of averaging the amounts of phase rotation of a plurality of branches and stable detection of the amount of phase rotation at, particularly, lower SNR.

As descried above, according to the present embodiment, interference cancellation PSC phase compensating section 40 is provided in addition to the configuration of Embodiment 1 and other spatial-multiplex PSC signals are canceled as interference components at PSC interference canceling section 51 and are subjected to maximum ratio combination, and thereby the SINR of the PSC signal is improved. Then, the phase rotation is detected by phase difference detecting section 52, so that it is possible to remove the phase difference that cannot be removed by phase compensating section 9.

That is, although, in phase compensating section 9, interference components are generated between PSC signals due to factors such as thermal noise and channel estimation error, and so the residual phase difference resulting from the interference components is included in output S6 of phase compensating section 9, this residual phase difference can be reduced by using interference cancellation PSC phase compensating section 40, so that it is possible to improve received characteristics.

Figure 8:
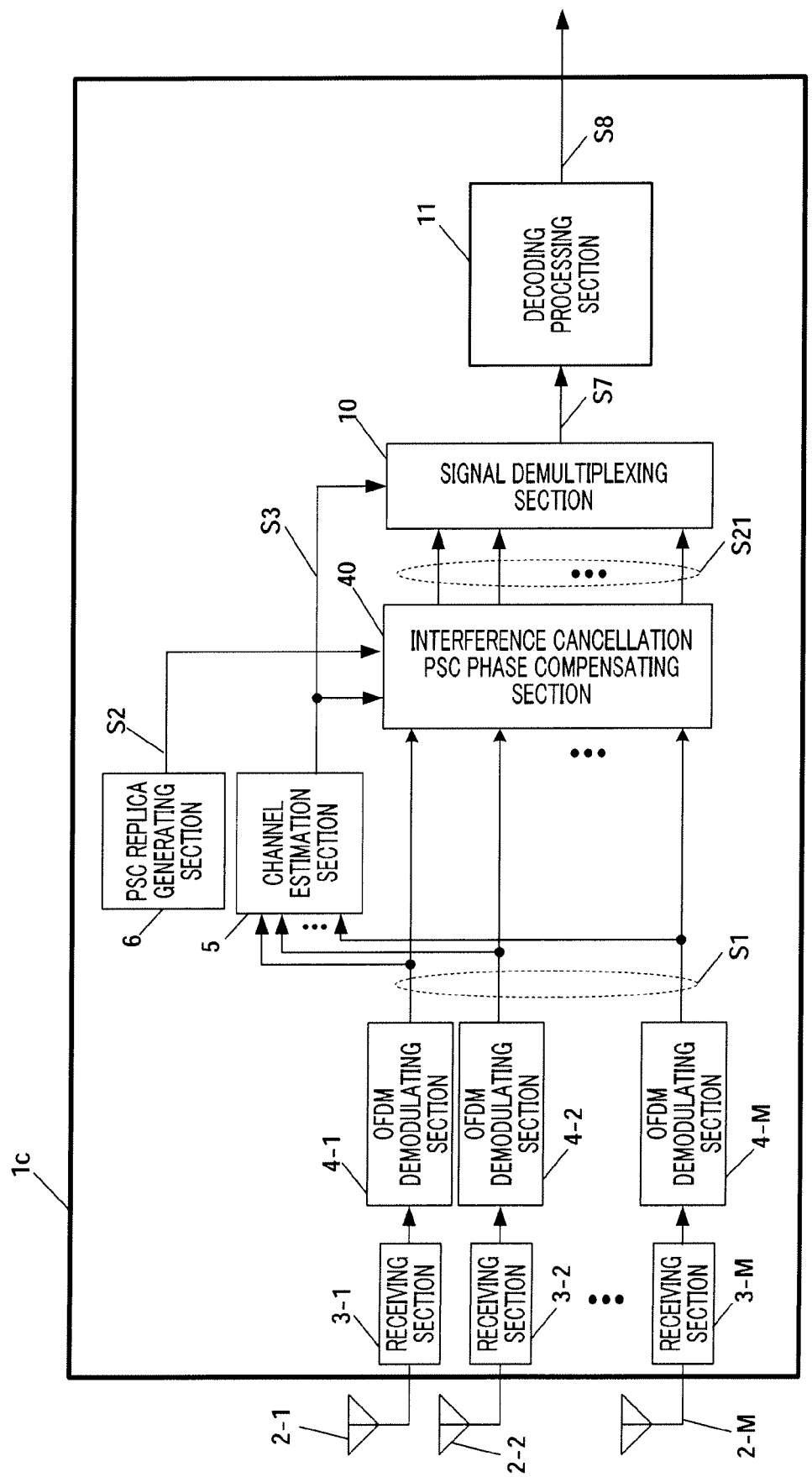
FIG. 8 is a block diagram showing another configuration example of the wireless communication apparatus according to Embodiment 2.

Further, although a case has been described with the above embodiment where interference cancellation PSC phase compensating section 40 is provided in addition to phase compensating section 9, the present invention is not limited to the present embodiment and, as shown in FIG. 8, a configuration that removes phase compensating section 9 may be used.

In FIG. 8, the same components as in FIG. 6 are assigned the same reference numerals, and, compared to wireless communication apparatus 1b of FIG. 6, wireless communication apparatus 1c of FIG. 8 has a configuration that removes phase compensating section 9 and inputs OFDM demodulated signal S1 to interference cancellation PSC phase compensating section 40. Interference cancellation PSC phase compensating section 40 differs in using OFDM demodulated signal S1 as an input signal instead of output S6 of phase compensating section 9, and the detailed operation is the same as described above. According to this configuration, as described above, interference cancellation PSC phase compensating section 40 removes other spatial-multiplex PSC signals, improves the SINR of the PSC signal by performing maximum ratio combination and detects the phase rotation, so that it is possible to improve received characteristics.

Further, a case has been described with the above embodiment where interference cancellation PSC phase compensating section 40 removes other spatial-multiplex PSC signals, improve the SINR of the PSC signal by performing maximum ratio combination and then improve the accuracy in phase compensation by detecting the phase rotation.

By the way, if the phase rotation is not common between antennas (if the directionality and Doppler fluctuation vary between antennas or if the local oscillator of the frequency conversion section on the transmitting side or the receiving side is not common between antennas), characteristics are likely to deteriorate by using the combination result. Taking this characteristic deterioration into account, in such a case, interference cancellation PSC phase compensating section 40 may detect the phase rotation per antenna without performing maximum ratio combination on a signal from which other spatial-multiplex signals are removed, and carry out phase compensation.

Embodiment 3

Figure 9:
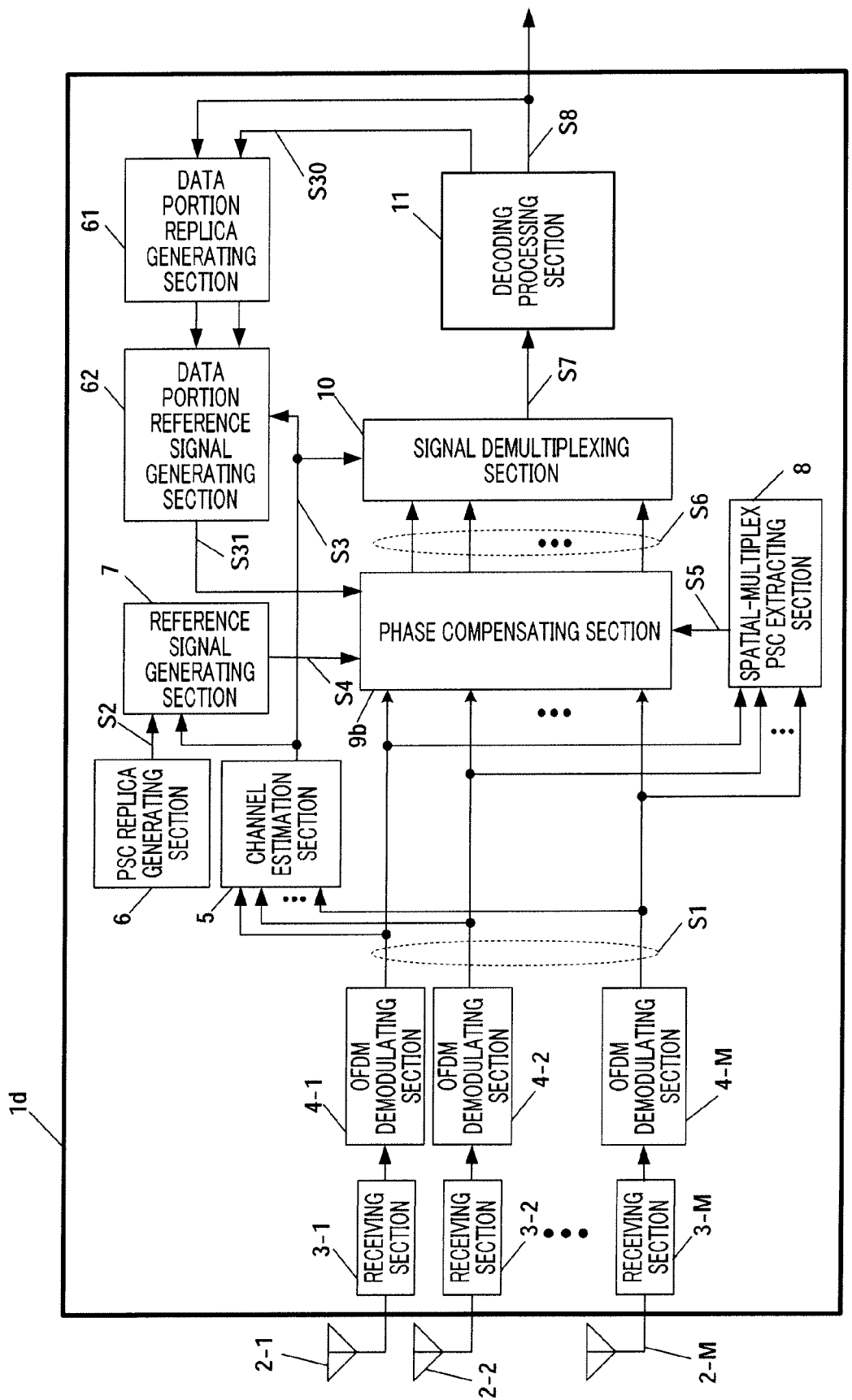
FIG. 9 is a block diagram showing a configuration of the wireless communication apparatus according to Embodiment 3.

FIG. 9 shows a configuration of the wireless communication apparatus according to Embodiment 3, and, in FIG. 9, the same components as in FIG. 3 are assigned the same reference numerals. Similar to FIG. 3, FIG. 9 shows only a configuration for reception in wireless communication apparatus 1d, and the illustration of the configuration for transmission is omitted.

Wireless communication apparatus 1d of the present embodiment differs from wireless communication apparatus 1 (FIG. 3) described in Embodiment 1 in outputting likelihood information S30 of each bit of decoded bit sequence S8 in addition to decoded data (hereinafter this decoded data is referred to as "decoded bit sequence") S8 from decoding processing section 11, having data portion replica generating section 61 and data portion reference signal generating section 62 that generate data portion reference signal S31 for a spatial-multiplex signal of data portion 22 using decoded bit sequence S8 and likelihood information S30 and carrying out phase compensation using data portion reference signal S31 in phase compensating section 9b.

Decoding processing section 11 obtains decoded bit sequence b(k) (S8 of FIG. 9) and likelihood information sequence LI(k) of each decoded bit (S30 of FIG. 9) by carrying out predetermined decoding processing as described in Embodiment 1.

Data portion replica generating section 61 carries out remodulation processing based on decoded bit sequence b(k). That is, data portion replica generating section 61 generates a bit data sequence subjected to error correction coding processing, puncturing processing and interleaving processing using the error correction coding scheme, the coding rate and the M-ary modulation value used upon transmission, carries out symbol mapping processing on the bit data sequence according to the M-ary modulation value and finally generates a data sequence corresponding to OFDM symbol data sequence Xd(m, fn) transmitted from a plurality of antennas.

Further, similarly, data portion replica generating section 61 carries out puncturing processing and interleaving processing on likelihood information sequence LI(k) (S30 of FIG. 9) of each bit. Further, data portion replica generating section 61 groups likelihood information sequence LI(k) of each bit, in bit units for carrying out symbol mapping, and obtains likelihood information Ld(m, fn) of entire symbol data from the grouped likelihood information sequence of each bit. To obtain likelihood information Ld(m, fn) of entire symbol data, the average likelihood value, or the weighting average, maximum or minimum value of each bit is used. Here, Xd(m, fn) and Ld(m, fn) are column vectors of order Nt equivalent to the number of transmission streams Nt, and these elements are OFDM symbol data transmitted from antennas. Further, m is the OFDM symbol data number, and fn is the subcarrier number.

Using output He(fn) (S3 of FIG. 9) of channel estimation section 5 and an output of data portion replica generating section 61, data portion reference signal generating section 62 generates a received signal which is influenced only by channel fluctuation He without phase rotation E due to the residual frequency difference according to AFC (Automatic Frequency Control) and which is subjected to spatial-multiplexing transmission, as data portion reference signal S31. That is, data portion replica generating section 61 generates data portion reference signal Xd(m, fn) (S31 of FIG. 9) of the fn-th subcarrier in the m-th OFDM symbol as represented by the following equation.

[19]

$$S_d(m,f_n) = H_e(f_n) X_d(m,f_n) \quad \text{(Equation 19)}$$

Phase compensating section 9b carries out phase compensation for OFDM demodulated signal S1 by referring to data portion reference signal S31. At this time, data portion reference signal S31 is delayed from OFDM demodulated signal S1 by the processing time in signal demultiplexing section 10, decoding processing section 11, data replica generating section 51 and data portion reference signal generating section 62 and, so phase compensating section 9b delays OFDM demodulated signal S1 by this time and carries out phase compensation.

Phase compensating section 9b carries out phase tracking for detecting the phase rotation of OFDM demodulated signal S1 by comparing OFDM demodulated signal S1 with data portion reference signal S31 and compensating for a phase difference due to the residual carrier frequency difference and sampling clock difference based on this detection result. That is, as represented by the following equation, phase compensating section 9b detects phase rotation $E_{est}(m, fn)$ of output Ye (m, fn) of OFDM demodulating section 4 with output $S_d(m, fn)$ of data portion reference signal generating section 62 as a reference.

[20]

$$E_{est}(m,f_n) = \text{angle}[Y_e(m,f_n)] - \text{angle}[S_d(m,f_n)] \quad \text{(Equation 20)}$$

Here, angle[x] is an operator for calculating the phase of variable x in a complex number.

Further, the phases rotate by the same amount in the same OFDM symbol, as represented by the following equation, phase compensating section 9b finds phase difference Lc(m) by calculating the phase obtained by weighting and averaging pilot subcarriers fn included in the same OFDM symbol based on phase rotations $E_{est}(m, fn)$ detected in subcarriers to correct residual carrier frequency difference Δfc based on this phase difference Lc(m).

[21]

$$L_c(m) = \sum_{f_n \in PSC(m)} a(f_n)E_{est}(m, f_n) \qquad \text{(Equation 21)}$$

Here, a(fn) is a coefficient satisfying the following equation. Weighting is carried out using the weighting coefficients based on likelihood information Ld (m, fn), which is transmitted, of entire symbol data.

[22]

$$\sum_{f_n \in PSC(m)} a(f_n) = 1 \qquad \text{(Equation 22)}$$

On the other hand, to correct sampling clock difference Δfa, phase compensating section 9b compares phase rotation $E_{est}(m_2, fn)$ with $E_{est}(m_1, fn)$ in the same subcarriers in different OFDM symbols (the m1-th symbol and the m2-th symbol) and estimates the amount of phase rotation Ls(m, fn) in the time domain.

As represented by the following equation, phase compensating section 9b carries out a phase tracking operation by multiplying OFDM demodulated signal Ye(k, fs) (S1 of FIG. 9) by the phase rotation for correcting the amount of phase rotation L(k, fs)=Lc(k)+Ls(k, fs) for each OFDM symbol and each subcarrier calculated as described above.

[23]

$$Z(k, f_s) = \begin{pmatrix} \exp(-jL^1(k, f_s)) & 0 & \cdots & 0 \\ 0 & \exp(-jL^2(k, f_s)) & \ddots & \vdots \\ \vdots & \ddots & \ddots & 0 \\ 0 & \cdots & 0 & \exp(-jL^M(k, f_s)) \end{pmatrix} Y_e(k, f_s) \qquad \text{(Equation 23)}$$

Here, L(k, fs) is a column vector of order M including the amount of phase rotation L'(k, fs) of each branch as the r-th element, and the amount of the phase rotation calculated by this equation per branch is applied.

Further, as another method, a method of detecting and compensating for common phase rotations in all branches by further averaging the amounts of phase rotation L'(k, fs) of branches may be applied.

The former compensating method enables receiving performance that reduces characteristic deterioration even in a wireless communication apparatus that uses local oscillators of different characteristics in a frequency conversion section on the transmitting side or in receiving section 3 on the receiving side. Further, the former compensating method enables receiving performance with little characteristics deterioration, if the antenna directionality varies between antennas and received signals are influenced by different Doppler fluctuations.

On the other hand, the latter compensating method enables improvement in the effect of averaging the amounts of phase rotation in a plurality of branches and stable detection of the amount of phase rotation at, particularly, lower SNR.

As described above, according to the present embodiment, data replica generating section 61 and data portion reference signal generating section 62 are provided in addition to the configuration of Embodiment 1, data portion reference signal S31 weighted according to likelihood information S30 is generated from decoded data S8 and phase compensation is carried out by phase compensating section 9b using data portion reference signal S31, so that it is possible to improve the accuracy in detecting the phase rotation much more than Embodiment 1 and further improve received characteristics.

Further, although a case has been described with the above present embodiment where phase compensating section 9b carries out phase compensation using data portion reference signal S31 generated by data replica generating section 61 and data portion reference signal generating section 62, reference signal S4 generated by reference signal generating section 7 may be used together. In this case, by carrying out weighting and combination of, for example, the detection result obtained using data portion reference signal S31 and the detection result obtained using reference signal S4, phase compensation may be carried out using the weighting combination result.

Embodiment 4

Figure 10:
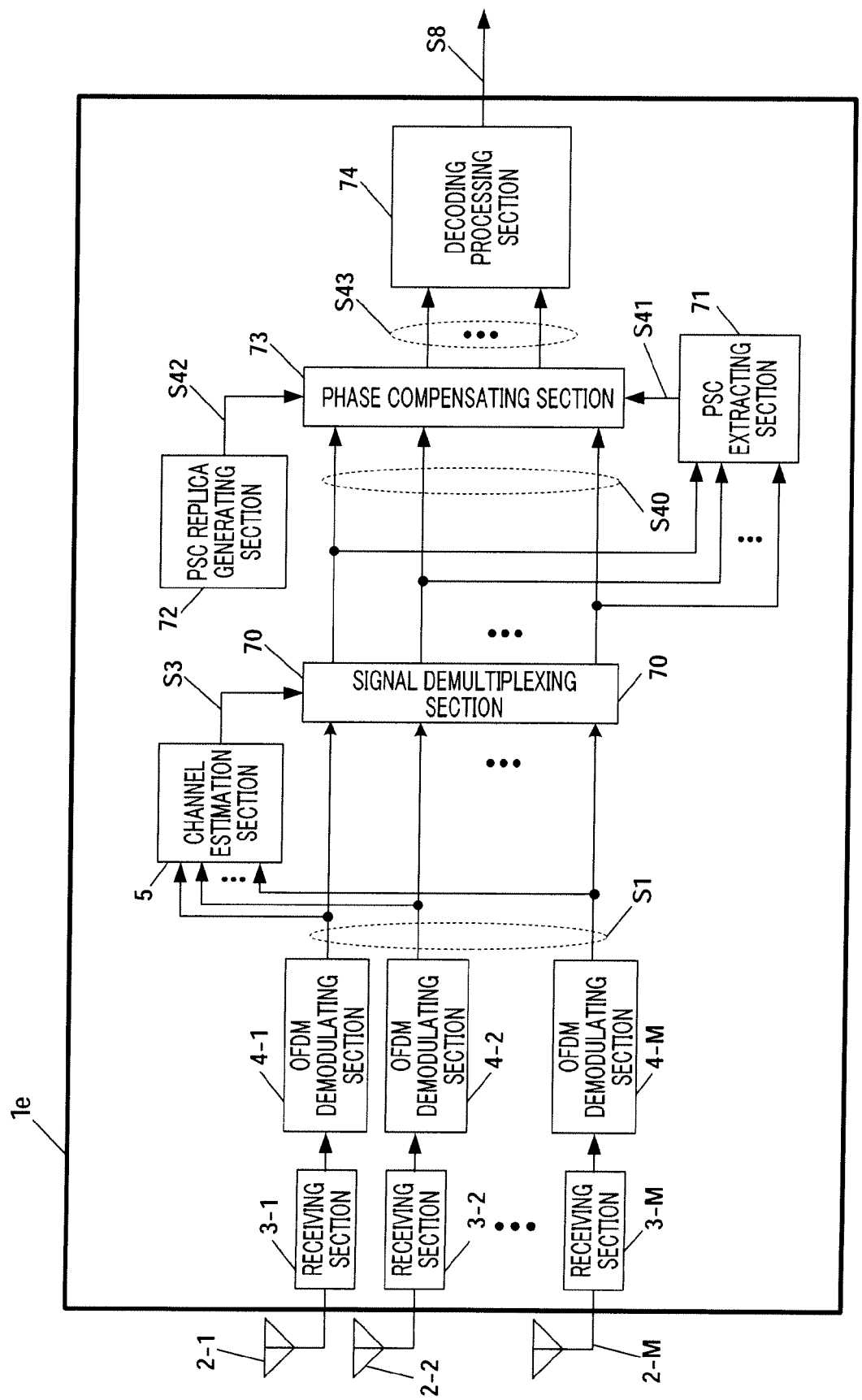
FIG. 10 is a block diagram showing a configuration of the wireless communication apparatus according to Embodiment 4.

FIG. 10 shows a configuration of the wireless communication apparatus according to Embodiment 4, and, in FIG. 10, the same components as in FIG. 3 will be assigned the same reference numerals. Similar to FIG. 3, FIG. 10 shows only the configuration for reception in wireless communication apparatus 1e, and the illustration of the configuration for transmission is omitted.

In wireless communication apparatus 1e of the present embodiment, signal demultiplexing section 70 that demultiplexes a spatial-multiplex signal to a signal before spatial-multiplexing is provided at a subsequent stage to an output of OFDM demodulating section 4 and phase compensating section 73 that carries out phase compensation for the demultiplex signal is provided at a subsequent stage to signal demultiplexing section 70.

Signal demultiplexing section 70 obtains demultiplex signal S40 from which the spatial-multiplex stream subjected to spatial-multiplexing transmission is demultiplexed by carrying out signal demultiplexing processing on OFDM demodulated signal S1 using channel estimation signal S3. To be more specific, signal demultiplexing section 70 carries out demultiplexing processing using a spatial linear filter such as ZF and MMSE. For example, if demultiplexing processing is carried out using ZF, as represented by the following equation, operation is carried out using an inverse matrix of channel estimation value He(fs) for each subcarrier obtained by channel estimation section 5.

[24]

$$Zd(k, f_s) = H_e(f_s)^{-1} Y_e(k, f_s) \qquad \text{(Equation 24)}$$

$$= H_e(f_s)^{-1}[E(k, f_s)H(k, f_s)X(k, f_s) + n(k, f_s)]$$

In this way, transmission symbol sequence Zd(k, fs) with phase rotation matrix E(k, fs) represented by the following equation is demultiplexed.

[25]

$$E_{est}(m, f_n) = \text{angle}[Z_{PSC}(m, f_n)] - \text{angle}[X_{PSC}(m, f_n)] \qquad \text{(Equation 25)}$$

Here, Zd(k, fs) is a column vector where the r-th element is transmission symbol sequence Zd(k, fs)$^{(r)}$ of the r-th transmission stream.

Pilot subcarrier (PSC) extracting section 71 extracts pilot subcarrier signal $Z_{psc}$(m, fn)$^{(r)}$ transmitted using a subcarrier (the fn-th subcarrier in the m-th OFDM symbol) of a specific (r-th) transmission stream, from demultiplex transmission symbol sequence Zd(k, fs) (demultiplex signal S40 of FIG. 10).

Pilot subcarrier (PSC) replica generating section 72 generates pilot subcarrier replica signal $X_{PSC}$(m, fn) (S42 of FIG. 10) transmitted using a specific subcarrier (hereinafter the fn-th subcarrier in the m-th OFDM symbol).

Phase compensating section 73 carries out phase tracking for detecting the phase rotation using PSC replica signal S42 from PSC replica generating section 72 and pilot subcarrier signal S41 from PSC extracting section 71, and compensating for the phase difference due to a residual carrier frequency difference and sampling clock difference.

To be more specific, as represented by equation 25, the phase rotation is detected by detecting phase rotation $E_{est}$(m, fn) of PSC signal S41 ($Z_{psc}$(m, fn)) from PSC extracting section 71 with PSC replica signal S42 ($X_{PSC}$(m, fn)) of PSC replica generating section 72 as a reference.

For residual carrier frequency difference Δfc, phases rotate by the same amount in the same OFDM symbol, and so, as represented by equation 7, phase difference Lc(m) is determined by calculating the phase obtained by weighting and averaging pilot subcarriers (fn) included in the same OFDM symbol based on common phase rotations $E_{est}$(m, fn) detected in subcarriers to correct residual carrier frequency difference Δfc based on this phase difference Lc(m).

Here, a(fn) in equation 7 is a coefficient that satisfies equation 8. Weighting is carried out using the weighting coefficients assigned in proportion to the received power or the received amplitude of output $Z_{psc}$(m, fn) of PSC extracting section 71.

On the other hand, to correct sampling clock difference Δfa, phase compensating section 73 compares the phase rotation between pilot subcarriers in the same subcarriers in different OFDM symbols, and estimates the amount of phase rotation L*s(m, fn) in the time domain.

Phase compensating section 73 carries out phase tracking by multiplying output signal S40 of signal demultiplexing section 70 by the phase rotation for correcting the amount of phase rotation L(m, fn)=Lc(m)+Ls(m, fn) for each OFDM symbol and each subcarrier calculated as described above.

Further, as another method, a method of detecting and compensating for common phase rotations in all branches by further averaging the amounts of phase rotation L'(m, fn) of branches may be applied.

The former compensating method enables receiving performance that reduces characteristic deterioration even in a wireless communication apparatus using local oscillators of different characteristics in frequency conversion section on the transmitting side or in receiving section 3 on the receiving side. Further, the former compensating method enables receiving performance that reduces characteristics deterioration if the antenna directionality varies between antennas and received signals are influenced by different Doppler fluctuations.

On the other hand, the latter compensating method enables improvement in the effect of averaging the amounts of phase rotation of a plurality of branches and stable detection of the amount of phase rotation at, particularly, lower SNR.

Decoding processing section 74 obtains decoded data S8 by carrying out the same processing on output signal S43 of phase compensating section 73 as in decoding processing section 11.

As described above, according to the present embodiment, channel estimation section 5 that calculates channel estimation value S3 of a pilot subcarrier using a known pilot signal, signal demultiplexing section 70 that demultiplexes a spatial-multiplex signal using channel estimation value S3 obtained by channel estimation section 5, PSC extracting section 71 that extracts known pilot subcarrier signal from demultiplex signal S40, PSC replica generating section 72 that generates pilot subcarrier replica signal S42 and phase compensating section 73 that detects the phase rotation by comparing pilot subcarrier signal S41 extracted from demultiplex signal S40 with pilot subcarrier replica signal S42 and carries out phase compensation for demultiplex signal S40 based on this detection result, are provided, so that it is possible to realize wireless communication apparatus 1e that, even in a case where the pilot subcarrier signal is spatial-multiplexed and transmitted, enables phase compensation with a simple configuration without dedicated circuitry for demultiplexing a pilot subcarrier signal.

That is, signal demultiplexing section 70 demultiplexes spatial-multiplex streams to streams before spatial-multiplexing and PSC extracting section 71 extracts pilot subcarrier signals in the demultiplex streams, so that it is possible to extract the pilot subcarrier signals without dedicated circuitry for demultiplexing the pilot subcarrier signals.

Further, although a case has been described with the above embodiment where signal demultiplexing section 70 carries out signal demultiplexing on a data subcarrier subjected to spatial-multiplexing transmission using the ZF method or the MMSE method, a method of demultiplexing the data subcarrier and a method of demultiplexing the pilot subcarrier may be different.

For example, signal demultiplexing section 70 first demultiplexes only pilot subcarriers subjected to spatial-multiplexing transmission to streams using the ZF method or the MMSE method. Phase compensating section 73 carries out phase detection using the demultiplex pilot subcarriers and carries out phase compensation for data subcarriers.

Then, signal demultiplexing section 70 uses another signal demultiplexing method such as the MLD using the data subcarriers subjected to phase compensation, and demultiplexes transmission streams subjected to spatial-multiplexing transmission. As a result, the configuration of phase compensating section 73 does not depend on the signal demultiplexing method for data subcarriers, so that a method of demultiplexing spatial-multiplex streams of data subcarriers in signal demultiplexing section 70 may be adaptively changed.

That is, it is possible to use the MLD method if the M-ary modulation value is small and use the ZF method if the M-ary modulation value such as 64 QAM is large to reduce the circuit scale for 64 QAM.

Embodiment 5

Figure 11:
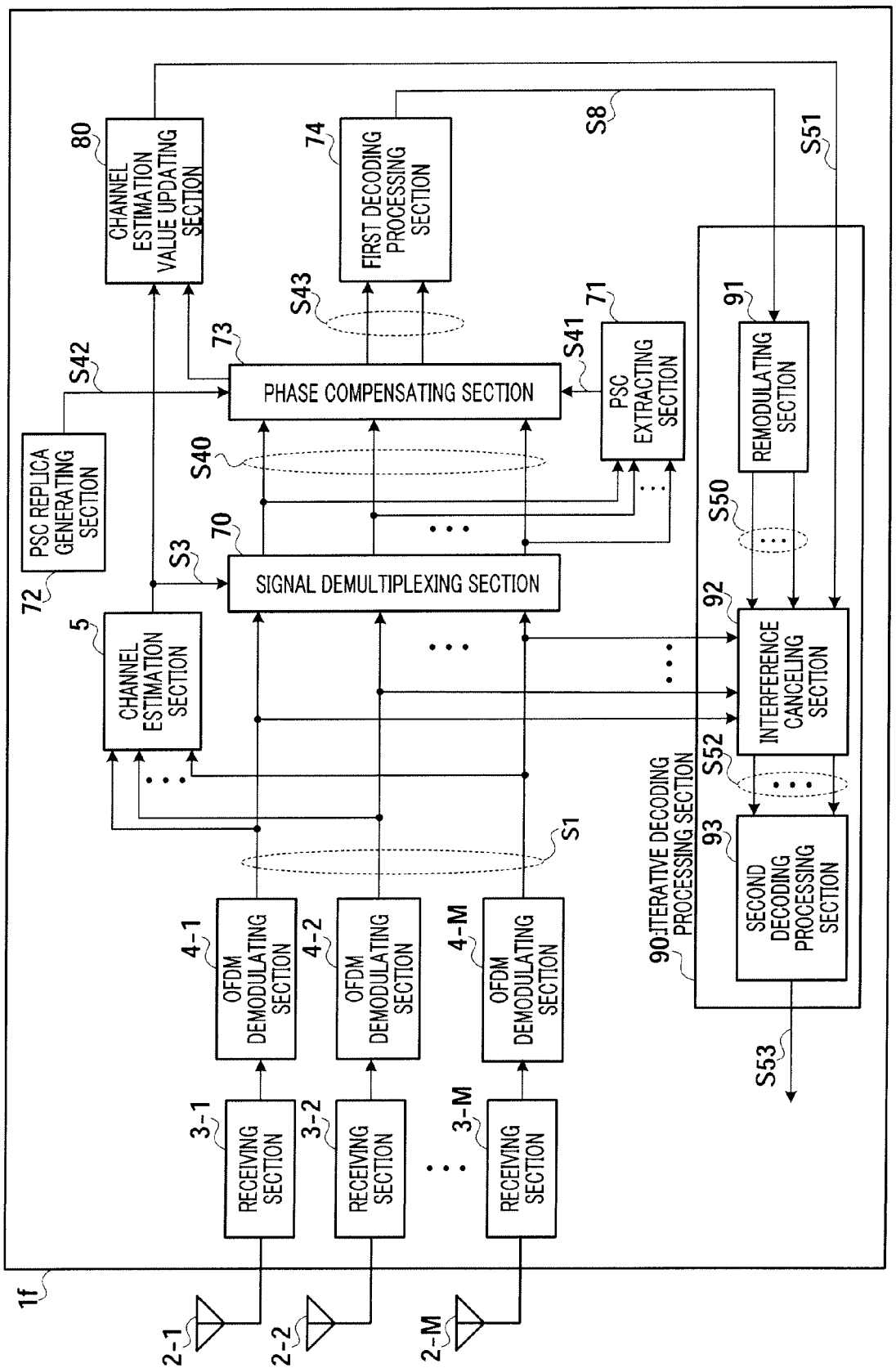
FIG. 11 is a block diagram showing a configuration of the wireless communication apparatus according to Embodiment 5.

FIG. 11 shows a configuration of the wireless communication apparatus according to Embodiment 5, and, in FIG. 11, the same components as in FIG. 10 are assigned the same reference numerals. Similar to FIG. 10, FIG. 11 shows only a configuration for reception in wireless communication apparatus 1f and the illustration of the configuration for transmission is omitted.

Wireless communication apparatus 1f of the present embodiment has iterative decoding processing section 90 in addition to the configuration of wireless communication apparatus 1e described in Embodiment 4. Iterative decoding processing section 90 has remodulating section 91 that carries out remodulation using a bit sequence obtained by carrying out error correction decoding on an output of first decoding processing section 74, interference canceling section 92 that subtracts other spatial-multiplex streams as interference signals from signals subjected to spatial-multiplexing transmission based on channel estimation result S3 of channel estimation section 5 (practically, signal S51 updated by channel estimation value updating section 80) and second decoding processing section 93.

Here, there are the parallel type and the serial type configurations for carrying out iterative decoding processing. When there are interference signals, the parallel type is directed to repeating the operation for collectively canceling interference signals and carrying out decoding processing. The serial type is directed to carrying out iterative decoding processing by sequentially decoding spatial-multiplex streams in order from higher received quality and removing signals decoded from received signals. Although a case will be described with the present embodiment as an example where parallel type interference cancellation processing is used, serial type interference cancellation processing may be applied.

Remodulating section 91 generates transmission symbol data based on decoded bit sequence b(k). That is, remodulating section 91 generates spatial-multiplex stream bit data sequence equivalent to the number of transmitted spatial-multiplex streams by carrying out error correction coding processing, puncturing processing and interleaving processing on a decoded bit sequence using the error correction coding scheme, M-ary modulation value and coding rate used upon transmission, and generates spatial-multiplex symbol data sequence $D_j(k, fs)$ for each subcarrier by carrying out symbol mapping processing according to the M-ary modulation value on spatial-multiplex stream bit data sequences.

Here, $D_j(k, fs)$ is a spatial-multiplex symbol data sequence of the j-th spatial-multiplex symbol data sequence, the k-th OFDM symbol and the fs-th subcarrier. Here, j=1 to Nt, and fs=1 to Nc. Further, D(k, fs) is a column vector of order Nt including $D_j(k, fs)$ as the j-th element.

Channel estimation value updating section 80 updates the amount of phase rotation L(k, fs) detected by phase compensating section 73 by applying channel estimation value S3 obtained at channel estimation section 5 to the amount of phase rotation L(k, fs). Here, an output signal of phase compensating section 73 obtained by carrying out signal demultiplexing in signal demultiplexing section 70 according to the ZF method can be represented by the following equation. If this equation is modified a little, the ZF method seems to be applied with respect to new channel estimation value B(k, fs) including the phase rotation according to phase compensation (that is, the inverse matrix of B(k, fs) is multiplied by Ye(k, fs)).

[26]

$$Xd(k, f_s) = \begin{pmatrix} \exp(-jL^1(k, f_s)) & 0 & \cdots & 0 \\ 0 & \exp(-jL^2(k, f_s)) & \ddots & \vdots \\ \vdots & \ddots & \ddots & 0 \\ 0 & \cdots & 0 & \exp(-jL^M(k, f_s)) \end{pmatrix} H_e(f_s)^{-1} Y_e(k, f_s)$$

$$= \left[ H_e(f_s) \begin{pmatrix} \exp(-jL^1(k, f_s)) & 0 & \cdots & 0 \\ 0 & \exp(-jL^2(k, f_s)) & \ddots & \vdots \\ \vdots & \ddots & \ddots & 0 \\ 0 & \cdots & 0 & \exp(-jL^M(k, f_s)) \end{pmatrix} \right]^{-1} Y_e(k, f_s)$$

$$= [B(k, f_s)]^{-1} Y_e(k, f_s)$$

(Equation 26)

Accordingly, channel estimation value updating section 80 forms B(k, fs) represented by the following equation as new channel estimation value S51.

[27]

$$B(k, f_s) = H_e(f_s) \begin{pmatrix} \exp(jL^1(k, f_s)) & 0 & \cdots & 0 \\ 0 & \exp(jL^2(k, f_s)) & \ddots & \vdots \\ \vdots & \ddots & \ddots & 0 \\ 0 & \cdots & 0 & \exp(jL^M(k, f_s)) \end{pmatrix}$$

(Equation 27)

Interference canceling section 92 regards spatial-multiplex streams other than the desired r-th spatial-multiplex stream as interference signals, removes the interference signals from output Ye(k, fs) of OFDM demodulating section 4 and outputs signal $v_r(k, fs)$ (S52 of FIG. 11) obtained by performing maximum ratio combination on results of receiving the r-th spatial-multiplex stream after cancellation, at a plurality of antennas. That is, $v_r(k, fs)$ is calculated according to the following equation.

[28]

$$v_r(k,f_s) = b_r(f_s)^T[Y_e(k,f_s) - B(k,f_s)G_r D(k,f_s)]$$ (Equation 28)

Here, $b_r(k, fs)$ is the r-th column vector in channel estimation value B(k, fs) for the fs-th subcarrier in the k-th OFDM symbol. The superscript T is the vector transposition operator and $G_r$ is the matrix where diagonal components of the r-th column and the r-th row in the unit matrix of order Nt is made zero. Further, r takes positive values between 1 and Nt. D(k, fs) is an output signal of remodulating section 91. Interference canceling section 92 carries out the above interference canceling operation with respect to all spatial-multiplex streams Nt.

Second decoding processing section 93 restores a transmission bit sequence by carrying out demapping processing, deinterleaving processing and error correction decoding processing on the output signal of interference canceling section 92. In this way, second decoding processing section 93 obtains decoded data S53.

As described above, according to the present embodiment, channel estimation value updating section 80 that updates channel estimation value S3 estimated at channel estimation section 5 using the amount of phase rotation detected at phase compensating section 73 and iterative decoding processing section 90 that carries out iterative decoding processing using updated channel estimation value S51 are provided in addition to the configuration of Embodiment 4, and iterative decoding is carried out using updated channel estimation value S51 of high accuracy, so that it is possible to obtain decoded data S53 of much better error rate characteristics in addition to the effect of Embodiment 4.

That is, iterative decoding processing section 90 cancels other spatial-multiplex signals as interference components from OFDM demodulated signal S1 using updated channel estimation value S51 in interference canceling section 92, so that it is possible to effectively cancel other spatial-multiplex signals as interference components from OFDM demodulated signal S1 including residual phase difference components and, consequently, carry out iterative decoding processing without undermining received characteristics improvement.

Further, as described in Embodiment 3, with the present embodiment, a signal regenerated as a replica signal using a decoding result may be made a reference signal for phase difference detection in phase compensating section 73. By so doing, the above effect is added to the effect described in Embodiment 3.

Further, with the present embodiment, the configurations of FIG. 12, FIG. 13, FIG. 14 and FIG. 15 are presented as other configurations than the configuration of FIG. 11.

Figure 12:
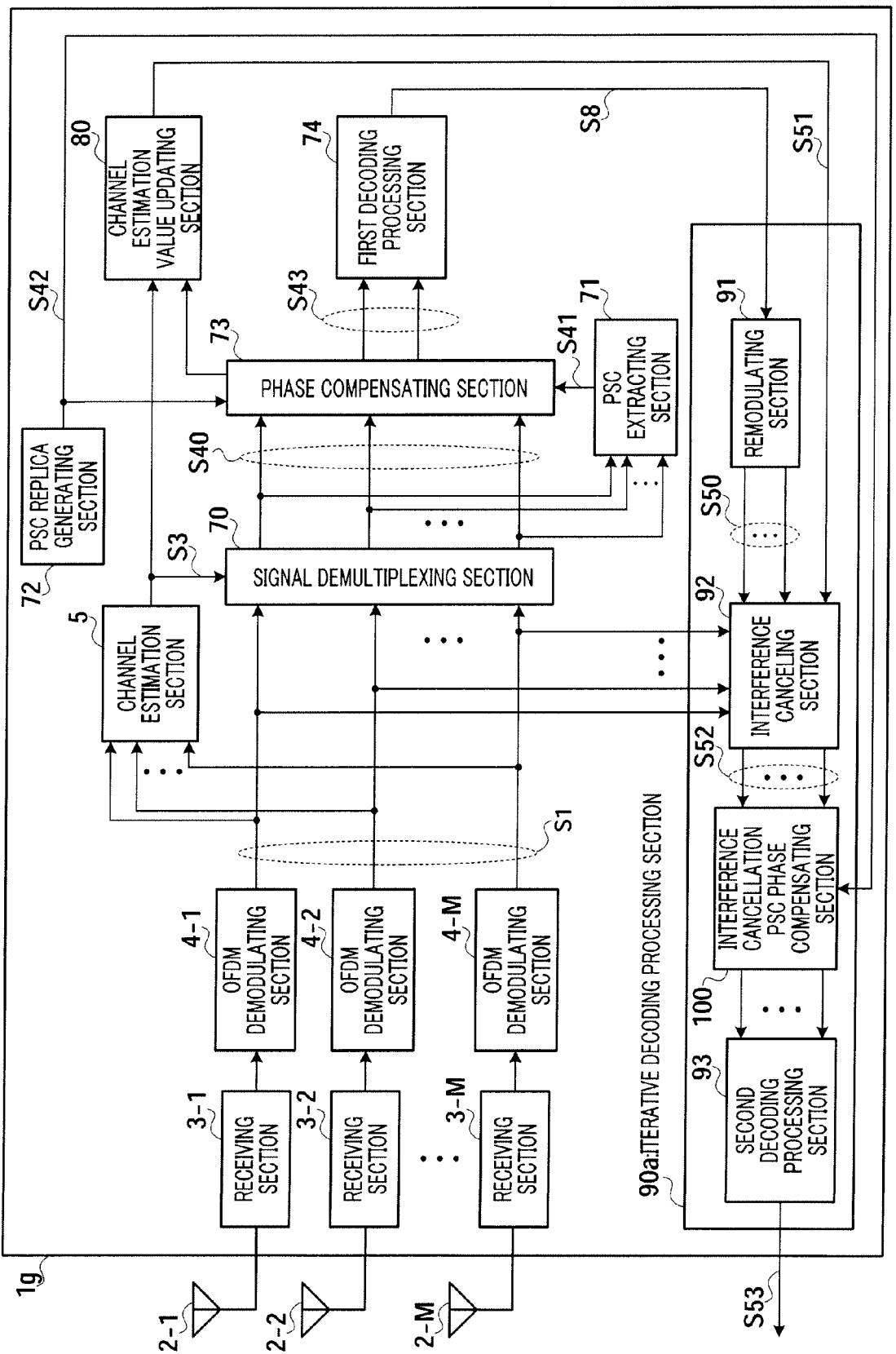
FIG. 12 is a block diagram showing another configuration example of the wireless communication apparatus according to Embodiment 5.

In FIG. 12, the same components as in FIG. 11 are assigned the same reference numerals, and wireless communication apparatus 1g of FIG. 12 differs from wireless communication apparatus 1f of FIG. 11 in the configuration of iterative decoding processing section 90. Iterative decoding processing section 90a of wireless communication apparatus 1g has interference cancellation PSC phase compensating section 100. Preferably, this configuration is applied to the case where interference canceling operation is carried out even on the pilot subcarrier (PSC) in interference canceling section 92.

Interference cancellation PSC phase compensating section 100 extracts the PSC after interference cancellation from output S52 of interference canceling section 92, and detects the phase rotation of signal $v_r(m, fn)$ after interference cancellation, with output S42 of PSC replica generating section 72, which matches the extracted PSC, as a reference. That is, as represented by the following equation, interference cancellation PSC phase compensating section 100 calculates phase rotation $E^r{}_{est}(m, fn)$ of signal $v_r(m, fn)$ after interference cancellation, with pilot subcarrier signal $X^r{}_{PSC}(m, fn)$, which is transmitted using a specific subcarrier in the r-th spatial-multiplex stream (the fn-th subcarrier in the m-th OFDM symbol), as a reference.

[29]

$$E^r{}_{est}(m,f_n) = \text{angle}[v_r(m,f_n)] - \text{angle}[X^r{}_{PSC}(m,f_n)] \quad \text{(Equation 29)}$$

Further, interference cancellation PSC phase compensating section 100 calculates the detection amount of phase difference L(m, fn) by averaging results of detecting phase differences between subcarriers and between OFDM symbols, and outputs signal q(m, fn) obtained by carrying out phase compensation as represented by the following equation with respect to the data signal portion in output S52 of interference canceling section 92, to second decoding processing section 93.

[30]

(Equation 30)

$$q(m, f_n) = \begin{pmatrix} \exp(-jL^1(m, f_n)) & 0 & \cdots & 0 \\ 0 & \exp(-jL^2(m, f_n)) & \ddots & \vdots \\ \vdots & \ddots & \ddots & 0 \\ 0 & \cdots & 0 & \exp(-jL^M(m, f_n)) \end{pmatrix} v_r(m, f_n)$$

Interference cancellation PSC phase compensating section 100 removes other spatial-multiplex PSC signals, improves the SINR of the PSC signal by performing maximum ratio combination, detects the phase rotation using this signal and carries out phase compensation.

By this means, according to the configuration of FIG. 12, in addition to the effect obtained by the configuration of FIG. 11, it is possible to remove the phase difference that cannot be removed at phase compensating section 73. That is, although, in phase compensating section 73, interference components are generated between PSC signals due to factors such as thermal noise and a channel estimation error, and so a residual phase difference resulting from the interference components is included in output S43 of phase compensating section 73, this residual phase difference can be reduced by using interference cancellation PSC phase compensating section 100, so that it is possible to improve received characteristics.

Figure 13:
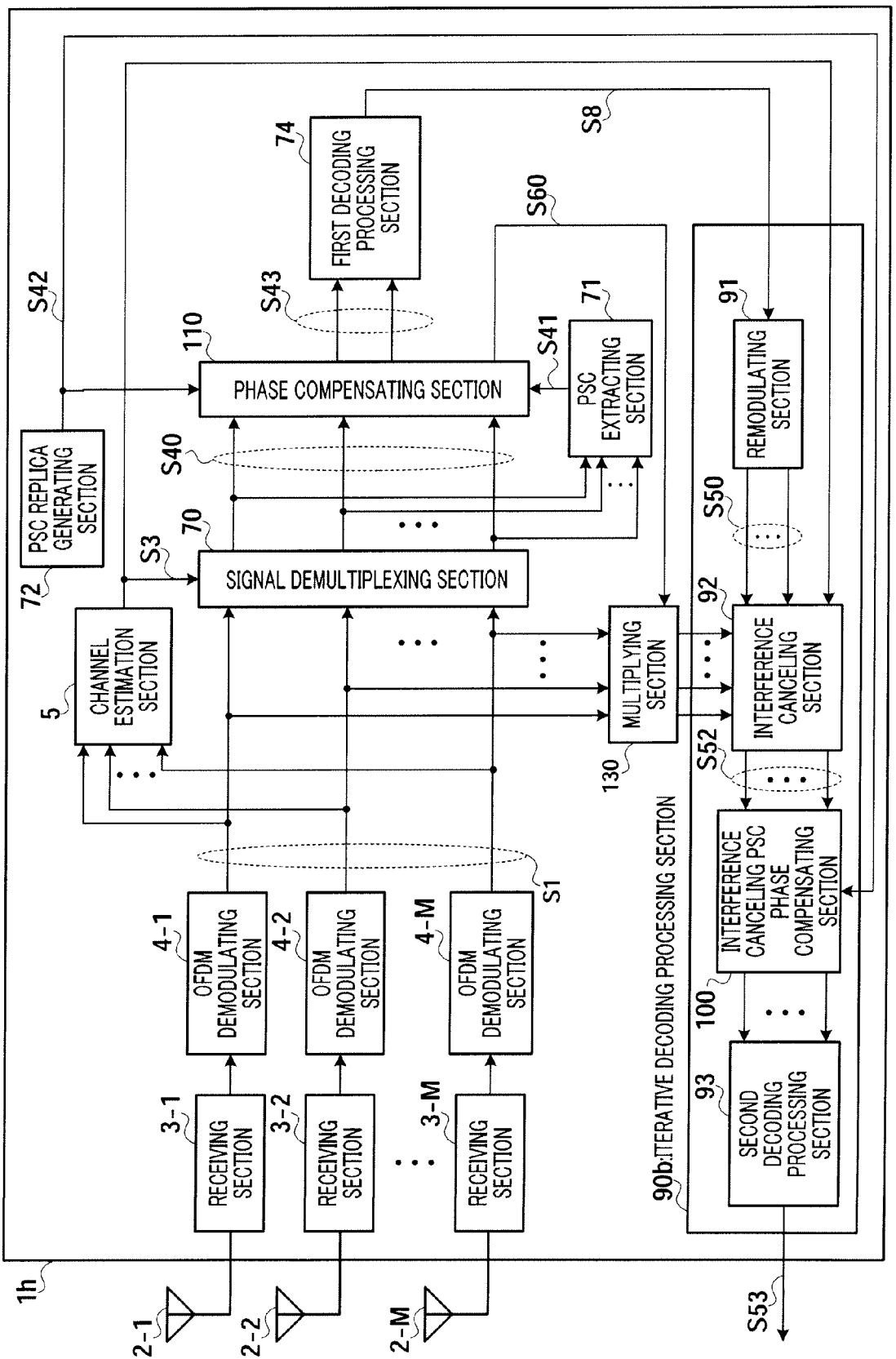
FIG. 13 is a block diagram showing another configuration example of the wireless communication apparatus according to Embodiment 5.

Next, another configuration of wireless communication 1h of FIG. 13 of the present embodiment will be described. In FIG. 13, the same components as in FIG. 12 are assigned the same reference numerals, and wireless communication apparatus 1h has a configuration that removes channel estimation value updating section 80 from the configuration of FIG. 12 and adds multiplying section 130 instead. Multiplying section 130 adds the phase rotation for compensating for the phase difference, to OFDM demodulated signal S1 based on phase difference detection result S60 of phase compensating section 110. That is, according to the configuration of FIG. 12, channel estimation value updating section 80 that updates channel estimation value S3 by applying the result of phase compensation to channel estimation value S3 is provided, and iterative decoding processing is carried out using updated channel estimation value S51, and, on the other hand, according to the configuration of FIG. 13, phase compensation is carried out for OFDM demodulated signal S1 and iterative decoding processing is carried out using the OFDM demodulated signal after phase compensation.

Similar to phase compensating section 73 of FIG. 12, phase compensating section 110 carries out phase tracking for detecting the phase rotation using output S42 of PSC replica generating section 72 and output S41 of PSC extracting section 71, and compensating for the phase difference due to the residual carrier frequency difference and sampling clock difference.

Further, phase compensating section 110 transmits the calculated detection amount of phase differences L (m, fn) (S60 of FIG. 13) for each OFDM symbol and each subcarrier to multiplying section 130.

Multiplying section 130 outputs OFDM demodulated signal Yc(m, fn) where a phase rotation difference is compensated for by carrying out multiplication as represented by the following equation, with respect to OFDM demodulated signal S1(Ye(m, fn)).

[31]

$$Y_c(m, f_n) = \begin{pmatrix} \exp(-jL^1(m, f_n)) & 0 & \cdots & 0 \\ 0 & \exp(-jL^2(m, f_n)) & \ddots & \vdots \\ \vdots & \ddots & \ddots & 0 \\ 0 & \cdots & 0 & \exp(-jL^M(m, f_n)) \end{pmatrix} Y_e(m, f_n)$$

(Equation 31)

Interference canceling section 92 in iterative decoding processing section 90b carries out the same processing described with the configuration of FIG. 12 using OFDM demodulated signal Yc(m, fn) where the phase rotation difference is compensated for. That is, interference canceling section 92 carries out interference cancellation processing as represented by the following equation by regarding spatial-multiplex streams as interference signals other than the desired r-th multiplex stream and canceling the interference signals from OFDM demodulated signal Yc(m, fn) where the phase rotation difference is compensated for.

[32]

$$v_r(m,f_n) = b_r(f_n)^T [Y_c(k,f_n) - H(f_n)G_r D(m,f_n)]$$ (Equation 32)

Next, interference canceling section 92 outputs signal $v_r(m, fn)$ obtained by performing out maximum ratio combination on results of receiving the r-th multiplex stream after interference cancellation, at a plurality of antennas.

According to the configuration of FIG. 13, in addition to the effect obtained by the configuration of FIG. 12, complex multiplication is carried out for phase compensation with respect to OFDM demodulated signal Ye(m, fn), so that it is possible to reduce the amount of operation compared to the case where the channel estimation value is compensated for. For example, if Nt spatial-multiplex streams are transmitted and are received at M antennas, the number of elements of the channel estimation value for each subcarrier is Nt×M, and the number of elements of OFDM demodulated signal Ye(m, fn) equivalent to the number of receiving antennas M, is sufficient, so that the number of multiplications is reduced (by 1/Nt) compared to the case where the channel estimation value is compensated for. As a result, wireless communication apparatus 1h is able to reduce the hardware scale and processing delay.

Figure 14:
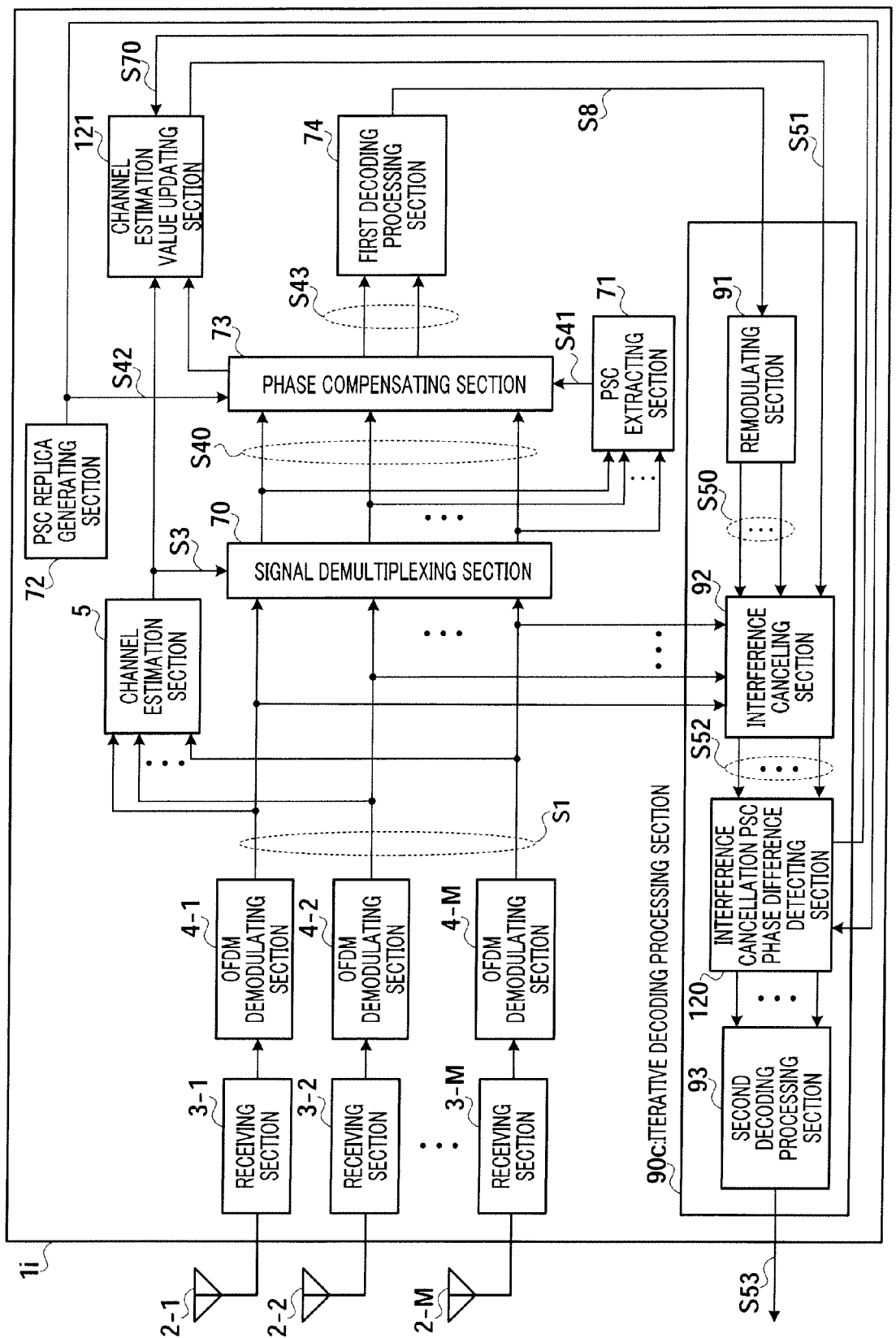
FIG. 14 is a block diagram showing another configuration example of the wireless communication apparatus according to Embodiment 5.

Next, wireless communication 1i of FIG. 14 of another configuration of the present embodiment will be described. In FIG. 14, the same components as in FIG. 12 are assigned the same reference numerals, wireless communication apparatus 1i has interference cancellation PSC phase difference detecting section 120 instead of interference cancellation PSC phase compensating section 100 compared to the configuration of FIG. 12. The operation of iterative decoding processing section 90c is as follows. Iterative decoding processing section 90c carries out the interference canceling operation on spatial-multiplex PSC signals preferentially over subcarriers of data portion 22, extracts PSC after interference cancellation from outputs S52 of interference canceling section 92 in interference cancellation PSC phase difference detecting section 120, detecting the phase rotation of signal $v_r(m, fn)$ from which the interference is canceled, with output S42 of PSC replica generating section 72, which matches the PSC after interference cancellation, as a reference and calculates the detection amount of phase difference L(m, fn) required for phase compensation.

Apart from wireless communication apparatus 1h of FIG. 12 that carries out phase compensation for a data subcarrier of the data signal portion in output S52 of interference canceling section 92 using the calculated detection amount of phase difference L (m, fn), wireless communication apparatus 1i adds the detection amount of phase difference L(m, fn) (S70 of FIG. 13) to channel estimation value updating section 121 and updates the channel estimation value again. Then, wireless communication apparatus 1i carries out iterative decoding operation again with respect to data subcarriers of the data portion using updated channel estimation value S51. Here, upon the second updating of the channel estimation value, as represented by the following equation, channel estimation updating section 121 calculates new channel estimation value C(m, fn) from B(m, fn) obtained upon the first updating of the channel estimation value using the detection amount of phase difference L(m, fn).

[33]

$$C(m, fn) = B(m, fn) \begin{pmatrix} \exp(jL^1(m, f_n)) & 0 & \cdots & 0 \\ 0 & \exp(jL^2(m, f_n)) & \ddots & \vdots \\ \vdots & \ddots & \ddots & 0 \\ 0 & \cdots & 0 & \exp(jL^M(m, f_n)) \end{pmatrix}$$

(Equation 33)

Hereinafter, iterative decoding processing section 90c carries out the same operation as described in FIG. 12 using new channel estimation value C(m, fn) instead of B(m, fn).

According to the configuration of FIG. 14, a channel estimation value is updated using phase difference detection result S70 of high accuracy obtained in interference cancellation PSC phase difference detecting section 120 and the data subcarrier signal of the data portion is subjected to iterative decoding processing using updated channel estimation value S51, so that, in addition to the effect obtained according to the configuration of FIG. 12, it is possible to reduce interference components of the same channel caused by carrying out the interference canceling operation using the first channel estimation value including more phase differences, and, consequently, obtain the effect of improving received characteristics.

Figure 15:
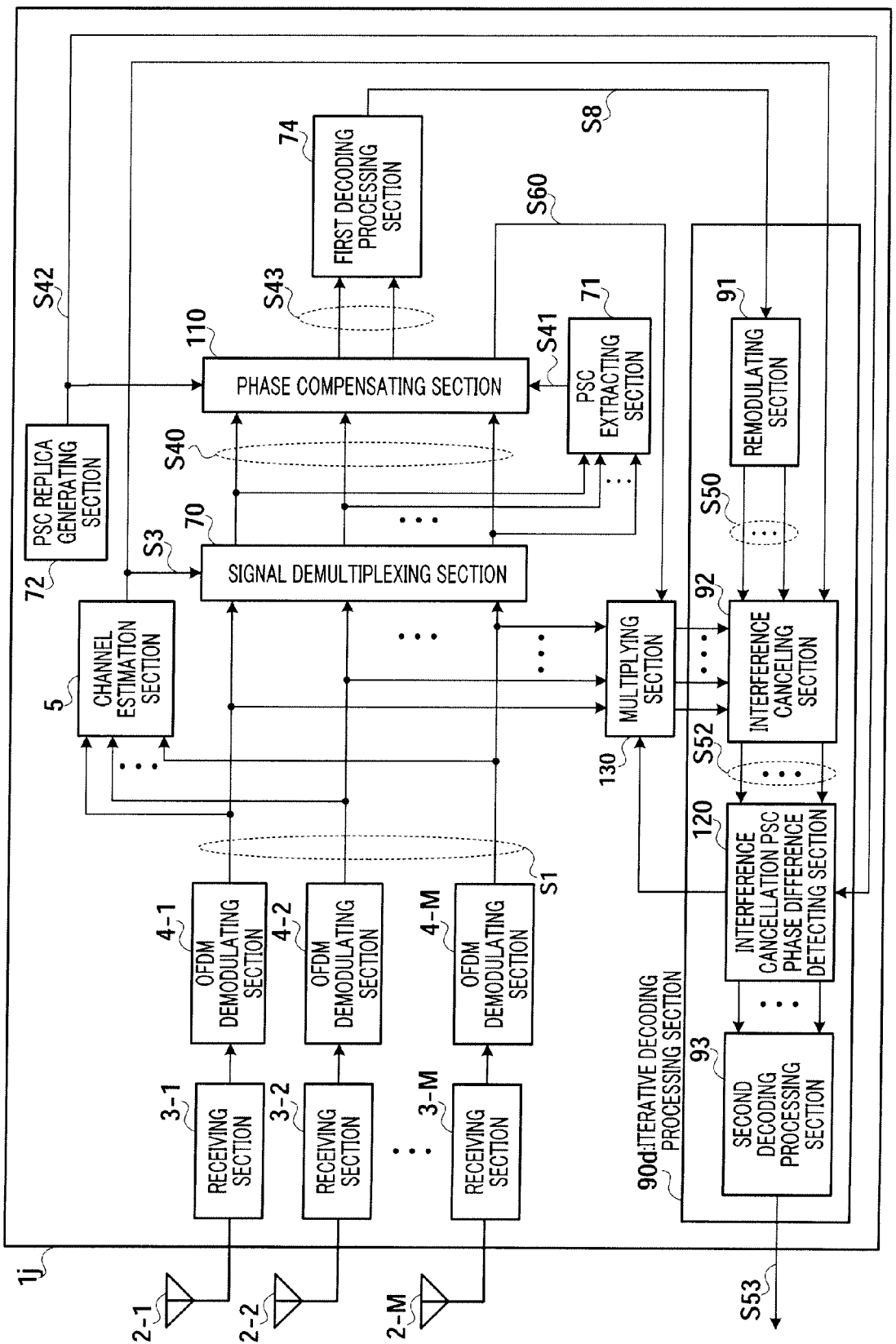
FIG. 15 is a block diagram showing another configuration example of the wireless communication apparatus according to Embodiment 5.

Next, wireless communication apparatus 1j of FIG. 15 of another configuration of the present embodiment will be described. In FIG. 15, the same components as in FIG. 14 are assigned the same reference numerals, and, compared to the configuration of FIG. 14, wireless communication apparatus 1j has a configuration that removes channel estimation value updating section 121 and adds multiplying section 130 instead. Multiplying section 130 adds a phase rotation for compensating for a phase difference included in the phase difference detection result of interference cancellation PSC phase difference detecting section 120, to OFDM demodulated signal S1. That is, according to the configuration of FIG. 14, channel estimation value updating section 121 that applies the phase compensation result to the channel estimation value is provided and iterative decoding processing is carried out using updated channel estimation value S51, and, on the other hand, wireless communication apparatus 1j carries out iterative decoding processing by carrying out phase compensation for OFDM demodulated signal S1.

Similar to iterative decoding processing section 90c of FIG. 14, iterative decoding processing section 90d carries out the interference canceling operation on spatial-multiplex PSC signals preferentially over subcarriers of data portion 22, extracts the PSC after interference cancellation from output S52 of interference canceling section 92 in interference cancellation PSC phase difference detecting section 120, detects the phase rotation of signal $v_r(m, fn)$ after interference cancellation, with output S42 of PSC replica generating section 72, which matches the PSC after interference cancellation, as a reference and calculates the detection amount of phase difference Lx(m,fn) required for phase compensation.

Multiplying section 130 adds the phase rotation detected at phase compensating section 110 to output Yc(m, fn) of OFDM demodulating section 4, and, as represented by the following equation, multiplies this signal, which is added the phase rotation, by the amount of phase rotation Lx(m, fn) for each OFDM symbol and each subcarrier calculated at interference cancellation PSC phase difference detecting section 120 of iterative decoding processing section 90d. As a result, multiplying section 130 outputs OFDM modulated signal Yx(m, fn) where the phase rotation difference in output signal S52 of interference canceling section 92 is compensated for in advance.

[34]

$$Y_x(m, f_n) = \begin{pmatrix} \exp(-jL_x^1(k, f_s)) & 0 & \cdots & 0 \\ 0 & \exp(-jL_x^2(k, f_s)) & \ddots & \vdots \\ \vdots & \ddots & \ddots & 0 \\ 0 & \cdots & 0 & \exp(-jL_x^M(k, f_s)) \end{pmatrix} Y_c(m, f_n)$$

(Equation 34)

In this way, instead of using output Yc(m, fn) of OFDM demodulating section 4 as is, interference canceling section 92 of iterative decoding processing section 90d carries out the same operation as described in FIG. 12 using OFDM demodulated signal Yx(m, fn) where the phase rotation difference is compensated for by multiplying section 130. That is, interference canceling section 92 carries out interference cancellation processing represented by the following equation by regarding spatial-multiplex streams as interference signals other than the desired r-th spatial-multiplex stream and canceling the interference signals from OFDM demodulated signal Yx(m, fn) where a phase rotation difference is compensated for.

[35]

$$v_r(m,f_n)=b_r(f_n)^T[Y_x(k,f_n)-H(f_n)G_rD(m,f_n)]$$ (Equation 35)

Next, interference canceling section 92 outputs signal $v_r(m, fn)$ obtained by performing maximum ratio combination on results of receiving the r-th spatial-multiplex stream after interference cancellation, at a plurality of antennas.

According to the configuration of FIG. 15, in addition to the effect obtained according to the configuration of FIG. 13, complex multiplication corresponding to the operation for carrying out phase compensation for the output signal of interference canceling section 92 is carried out in advance with respect to OFDM demodulated signal Yc(m, fn), so that it is possible to reduce the amount of operation compared to the case where a channel estimation value is compensated for. For example, if Nt spatial-multiplex streams are transmitted and are received at M antennas, the number of elements of the channel estimation value for each subcarrier is Nt×M, and, on the other hand, the number of elements of OFDM demodulated signal Ye(m, fn) equivalent to the number of receiving antennas M is sufficient, so that it is possible to reduce the number of multiplications by 1/Nt. Consequently, wireless communication apparatus 1j is able to reduce the hardware scale and delay processing.

Embodiment 6

Figure 16:
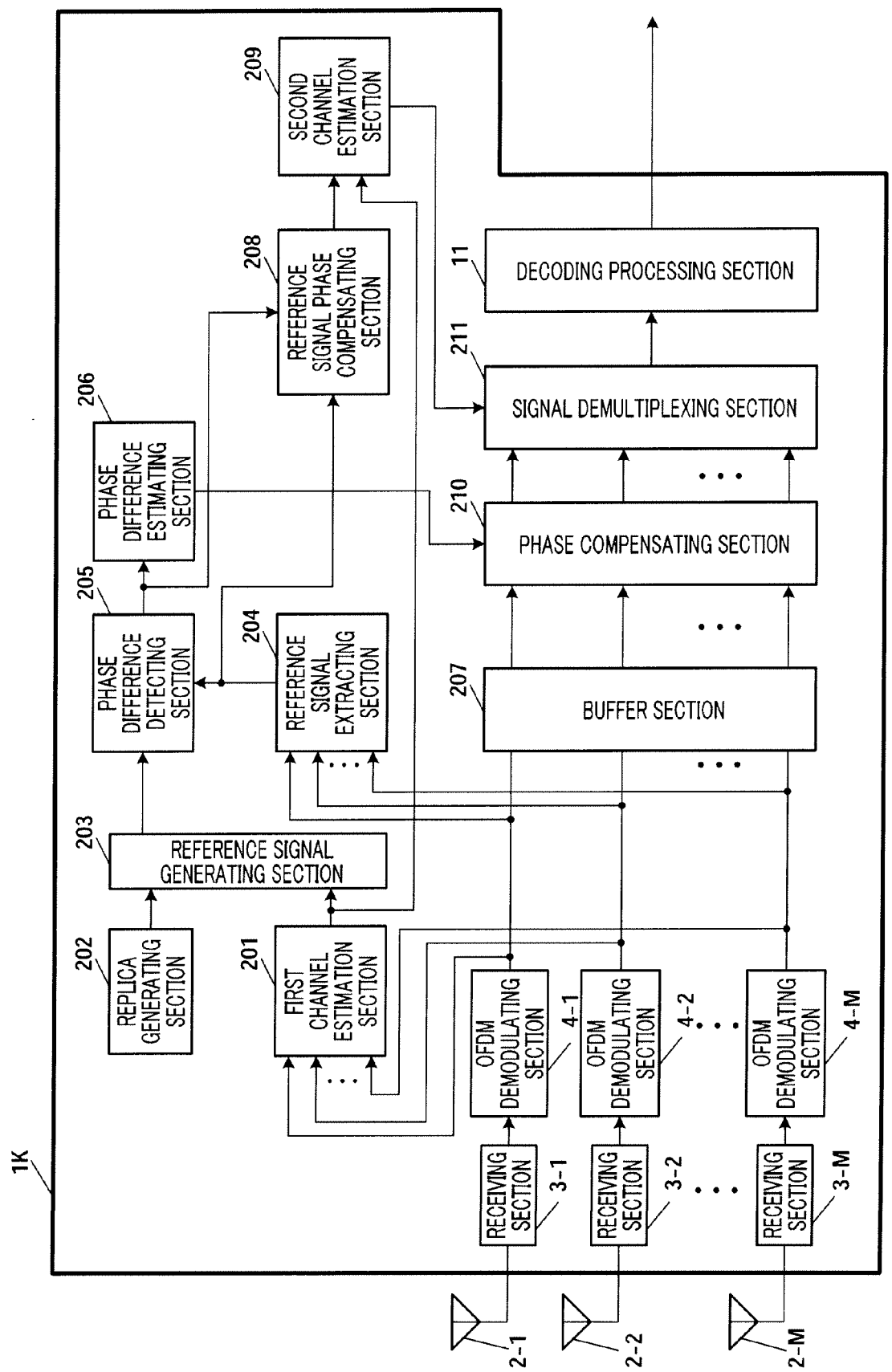
FIG. 16 is a block diagram showing a configuration example of the wireless communication apparatus according to Embodiment 6.

FIG. 16 shows a configuration of the wireless communication apparatus according to Embodiment 6.

Further, in FIG. 16, the same components as in FIG. 3 described in Embodiment 1, will be assigned the same reference numerals and the same components as in the configuration described in Embodiment 1 will not be described.

Figure 17:
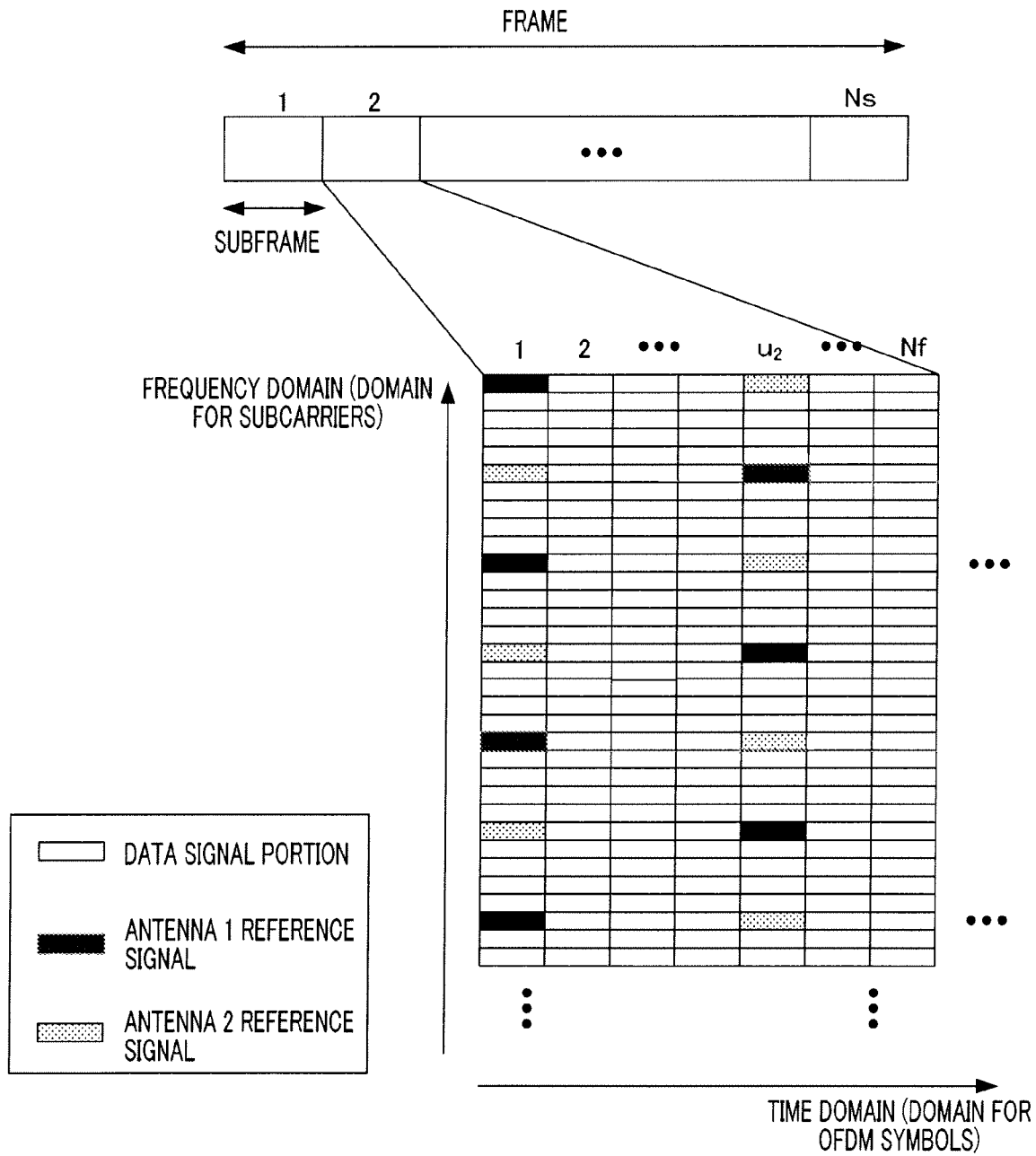
FIG. 17 shows a configuration example of a packet according to Embodiment 6.

FIG. 17 shows a configuration example of a frame of a packet received by wireless communication apparatus 1k of FIG. 16. That is, a wireless communication apparatus which is a communicating party of wireless communication apparatus 1k, transmits a packet of a frame configuration shown in FIG. 17.

The frame configuration of FIG. 17 will be described. One frame is configured with a plurality of Ns subframes, and one subframe includes Nf OFDM symbols. A subframe is configured with reference signal portions which are known in advance, and data signal portions including control signals other than reference signals. Further, control signals include, for example, information of the coding rate of the error correction code of a signal to be transmitted, and the M-ary modulation value. In subframes, the subframes painted black are reference signals transmitted from the first antenna and the shaded subframes are reference signals transmitted from the second antenna. The blank subframes are data signal portions.

Reference signals are inserted intermittently in the domain for subcarriers and in the domain for OFDM symbols to be used for channel estimation. One OFDM symbol includes a plurality of Nc subcarriers. When spatial-multiplexing transmission is carried out, reference signals transmitted from different antennas are arranged such that subcarrier insertion positions are shifted from one another.

Then, if a reference signal is transmitted using a subcarrier from a transmitting antenna, other antennas transmit the subcarrier as a null carrier (that is, transmission using this subcarrier is not carried out).

In this way, upon spatial-multiplexing, by transmitting reference signals from different antennas using different subcarriers, it is possible to carry out frequency division multiplexing (FDM) on and transmit reference signals and demultiplex the reference signals upon reception.

Further, although a case will be described where FDM is employed for the method of multiplexing reference signals upon spatial-multiplexing, the method of multiplexing reference signals to which the present embodiment is applicable, is not limited to this. For example, if time division multiplexing (TDM) using different OFDM symbols or code division multiplexing (CDM) using different code sequences is used, the present embodiment can be applied in the same way.

Wireless communication apparatus 1K of the present embodiment will be described below using FIG. 16. Wireless communication apparatus 1K receives high frequency signals of a desired carrier frequency band at a plurality of M receiving antenna 2-1 to 2-M. Receiving sections 3-1 to 3-M carry out amplification processing, band limitation processing and frequency conversion processing on high frequency signals received at a plurality of receiving antennas 2-1 to 2-M, respectively, and outputs complex baseband signals formed with in-phase signals and quadrature-phase signals.

OFDM demodulating section 4-1 to 4-M carry out OFDM demodulation on inputted baseband signals by carrying out time synchronization processing, frequency synchronization processing, GI (guard interval) removal, IFFT processing and serial-to-parallel conversion, respectively, and outputs symbol data sequences of Nc subcarriers as OFDM demodulated signals.

Further, the symbol data sequence of the fs-th subcarrier upon reception of the k-th OFDM symbol will be represented by Y(k, fs) below. Here, Y(k, fs) is a column vector including signals received at M antennas 2-1 to 2-M used for reception, as elements. That is, assume that signal $y_m$(k, fs) outputted from OFDM demodulating section 4-$m$ that receives as input a signal received at antenna 2-$m$ is the m-th element.

First channel estimation section 201 estimates channel fluctuation in each subcarrier as a complex amplitude including the amplitude and phase rotation using the first OFDM symbol including reference signals of transmitted subframes (this estimation value will be referred to as "channel estimation value" below). Assume that the first OFDM symbols including the reference signals in subframes are the $u_1$-th OFDM symbol (in FIG. 5, a case of $u_1$=1 is shown). Here, if reference signals are inserted intermittently in the domain for subcarriers (in the frequency domain), channel estimation values for subcarriers to which reference signals are not inserted, are obtained by using interpolation processing in the domain for subcarriers. For interpolation processing, there is a known technique disclosed in, for example, Patent Document (Japanese translation of a PCT application Laid-Open No. 2006-515481), and so detailed description will be omitted.

Using the OFDM symbol including the second reference signal in the subframe (the $u_2$-th OFDM symbol in subframes), replica generating section 202 generates replica signal $X_{PSC}(u_2, fn)$ of a reference signal which is known in advance and which is transmitted using a specific subcarrier (hereinafter the fn-th subcarrier in the $u_2$-th OFDM symbol in subframes). Here, replica signal $X_{PSC}(u_2, fn)$ is transmission sequence vector $X_{PSC}(u_2, fn)=[x_1(u_2, fn), \ldots, x_{Nt}(u_2, fn)]^T$ including transmission sequence $x_n(u_2, fn)$ of the reference signal of the fn-th subcarrier in the $u_2$-th OFDM symbol transmitted from transmitting antennas as element. Here, for null carriers where no signal transmission is carried out, the element in the transmission sequence is made zero.

As represented by the following equation, reference signal generating section 203 generates reference signal $S_{PSC}(u_2, fn)$ using estimation value He($u_1$, fn) of channel matrix H($u_1$, fn) obtained by first channel estimation section 201 and replica signal $X_{PSC}(u_2, fn)$ obtained by replica generating section 202.

[36]

$$S_{psc}(u_2,f_n)=H_e(u_1,f_n)X_{PSC}(u_2,f_n) \quad \text{(Equation 36)}$$

In this way, reference signal generating section 203 generates reference signal $S_{PSC}(u_2, fn)$ corresponding to a received signal where pilot subcarrier $X_{PSC}(u_2, fn)$ transmitted using the fn-th subcarrier in the $u_2$ OFDM symbol is influenced by channel fluctuation without phase rotation due to phase rotation E.

As represented by the following equation, reference signal extracting section 204 extracts received signal Ye($u_2$, fn) of a specific subcarrier (the fn-th subcarrier in the $u_2$-th OFDM symbol) of the OFDM symbol (the $u_2$-th OFDM symbol in subframes) including the second reference signal in subframes, from received signal Ye (k, fs) represented by equation 2.

[37]

$$Y_e(u_2,f_n)=E(u_2,f_n)H(u_2,f_n)X_{PSC}(u_2,f_n)+n(u_2,f_n) \quad \text{(Equation 37)}$$

Phase difference detecting section 205 detects the phase rotation of the received reference signal using the reference signal generated by reference signal generating section 203 and the received reference signal extracted by reference signal extracting section 204. To be more specific, as represented by the following equation, the phase rotation is detected by detecting phase rotation $E_{est}$(m, fn) of received reference signal (Ye($u_2$, fn)) with reference signal ($S_{PSC}(u_2$, fn)) as a reference.

[38]

$$E_{est}(u_2,f_n)=\text{angle}[Y_e(u_2,f_n)]-\text{angle}[S_{PSC}(u_2,f_n)] \quad \text{(Equation 38)}$$

Here, angle [x] is an operator for calculating the phase of variable x in a complex number, and, if x is a column vector, phase calculation is carried out per vector element.

For residual carrier frequency Δfc, the phase rotates by the same amount in the same OFDM symbol. By this means, as represented by the following equation, phase difference detecting section 205 finds phase difference Lc(m) by calculating the phase obtained by weighting and averaging pilot subcarriers fn included in the same OFDM symbol based on common phase rotations $E_{est}(u_2$, fn) detected in subcarriers.

[39]

$$L_c(u_2) \sum_{f_n \in PSC(u_2)} a(f_n)E_{est}(u_2, f_n) \quad \text{(Equation 39)}$$

Here, a(fn) is a diagonal matrix of order M satisfying the following equation (the elements other than diagonal components are zero). Weighting is carried out by assigning the weighting coefficients in proportion to the received power or the received amplitude of subcarrier signal Ye($u_2$, fn). Further, PSC($u_2$) is a set which includes as an element the subcarrier number of the subcarrier transmitting the reference signal included in the $u_2$-th OFDM symbol.

[40]

$$\sum_{f_n \in PSC(u_2)} a(f_n) = I_M \quad \text{(Equation 40)}$$

Further, as another method of calculating phase difference Lc($u_2$), the following equation can be applied. In this case, phase rotations detected in a plurality of pilot subcarriers are weighted in proportion to the received power and combined. Here, the symbol ".*" in the following equation represents multiplication carried out per element which is at the same position of a vector.

[41]

$$L_c(u_2) = \text{angle}\left[\sum_{f_n \in PSC(u_2)} Y_e(u_2, f_n) \cdot * S_{PSC}^*(u_2, f_n)\right] \quad \text{(Equation 41)}$$

Phase difference estimating section 206 calculates the amount of phase rotation of all OFDM symbols based on the common amounts of phase rotation Lc($u_2$) in OFDM symbols calculated as described above. Here, the amount of phase rotation of the OFDM symbol not including the reference signal is determined by interpolation or extrapolation using the amount of phase rotation Lc($u_2$) of the OFDM symbol including the reference signal. For example, when linear interpolation processing is carried out, the amount of phase rotation L(k) of the k-th OFDM symbol in subframes is calculated using the following equation. Here, k=1 to Nf.
[42]

$$L(k) = \frac{k - u_1}{u_2 - u_1} L_c(u_2) \qquad \text{(Equation 42)}$$

Buffer section 207 stores the subcarrier signal, including the second reference signal included in the subframe in a transmitted packet, of OFDM symbols preceding to the $u_2$-th OFDM symbol, per subcarrier on a temporary basis, and outputs the subcarrier signals in order from the stored subcarrier signals. By this means, the time lag until the amount of phase rotation $L(k_0)$ of OFDM symbols preceding to the $u_2$-th OFDM symbol is detected using the result of detecting the amount of phase rotation $L(u_2)$ in the $u_2$-th OFDM symbol, is cancelled.

As represented by the following equation, phase compensating section 210 compensates for the phase rotation difference by multiplying received signal vector Ye(k, fs) of subcarrier fs including the data signal, by the phase rotation for correcting the amount of phase rotation L(k) for each OFDM symbol estimated by phase difference estimating section 206.
[43]

$$Z(k, f_s) = \begin{pmatrix} \exp(-jL^1(k)) & 0 & \cdots & 0 \\ 0 & \exp(-jL^2(k)) & \ddots & \vdots \\ \vdots & \ddots & \ddots & 0 \\ 0 & \ddots & 0 & \exp(-jL^M(k)) \end{pmatrix} Y_e(k, f_s) \qquad \text{(Equation 43)}$$

Further, L(k) is a column vector of order M including the amount of phase rotation $L^r(k)$ of each branch as the r-th element, and the amount of phase rotation calculated by this equation per branch is applied.

Further, as another method, a method of detecting and compensating for common phase rotations in all branches by further averaging the amounts of phase rotation of branches, may be applied.

The former method of compensating for the phase rotation difference enables receiving performance with little characteristic deterioration if local oscillators of different characteristics are used in the frequency conversion section on the transmitting side or in receiving section 3 on the receiving side, or if the antenna directionality varies between antennas and received signals are influenced by different Doppler fluctuations.

On the other hand, the latter method of compensating for the phase rotation difference enables improvement in the effect of averaging the amounts of phase rotation of branches received at a plurality of antennas and improvement in detecting the amount of phase rotation at, particularly, lower SNR.

Reference signal phase compensating section 208 compensates for phase rotations of received reference signals using the amounts of phase rotation $Lc(u_2)$, detected at phase difference detecting section 205, of the OFDM symbols including reference signals. That is, phase compensation represented by the following equation is carried out for received signal $Ye(u_2, fn)$ of a reference signal transmitted using a specific subcarrier (the fn-th subcarrier in the $u_2$-th OFDM symbol) represented by equation 37.
[44]

$$Z(u_2, f_n) = \begin{pmatrix} \exp(-jL^1(u_2)) & 0 & \cdots & 0 \\ 0 & \exp(-jL^2(u_2)) & \ddots & \vdots \\ \vdots & \ddots & \ddots & 0 \\ 0 & \ddots & 0 & \exp(-jL^M(u_2)) \end{pmatrix} Y_e(u_2, f_n) \qquad \text{(Equation 44)}$$

Second channel estimation section 209 calculates channel estimation value He(u, fs) for each subcarrier using a reference signal subjected to phase compensation by reference signal phase compensating section 208. Further, according to interpolation processing, second channel estimation section 209 calculates channel estimation value He(k, fs) for each subcarrier of the OFDM symbol not including the reference signal using the determined channel estimation value and the channel estimation value calculated at first channel estimation section 201. Here, k=1 to Nf.

Signal demultiplexing section 211 demultiplexes a spatial-multiplex stream subjected to spatial-multiplexing transmission by carrying out signal demultiplexing processing on an output of phase compensating section 210, using channel estimation result He(k, fs) from second channel estimation section 209.

Processing of demultiplexing a spatial-multiplex stream is a known technique disclosed in, for example, Non-Patent Document 1, and so will not be described in detail. For example, when a spatial-multiplex stream is demultiplexed according to the ZF (Zero Forcing) method, as represented by the following equation, transmission symbol sequence Xd(k, fs) is demultiplexed by calculating an inverse matrix of channel estimation value He(k, fs) for each OFDM symbol and each subcarrier obtained at channel estimation section 209.

Further, demultiplexing processing in signal demultiplexing section 211 is not limited to the ZF method, and may employ other methods such as the MMSE (Minimum Mean Square Error) method and the MLD (Maximum likelihood Detection)method. Further, if spatial-multiplexing transmission is not carried out, equalization processing may be carried out.
[45]

$$X_d(k, f_s) = H_e(k, f_s)^{-1} Z(k, f_s) \qquad \text{(Equation 45)}$$

As described above, wireless communication apparatus 1*k* of the present embodiment has: first channel estimation section 201 that calculates a channel estimation value using a known first reference signal included in a received signal subjected to multicarrier modulation; replica generating section 202 that generates a replica signal of the second reference signal included in a time domain different from the first reference signal; reference signal generating section 203 that generates a reference signal by adding channel fluctuation according to the channel estimation value to the replica signal; reference signal extracting section 204 that extracts the second reference signal from the received signal subjected to multicarrier modulation; phase difference detecting section 205 that detects the phase difference of the received signal by comparing the reference signal obtained at reference signal generating section 203 with the signal obtained at reference signal extracting section 204; and phase compensating section 210 that compensates for the phase difference of the received signal based on an output of phase difference detecting section 205.

By this means, according to the present embodiment, if reference signals for channel estimation are inserted intermittently in subcarriers subjected to multicarrier modulation, it is possible to compensate for the phase difference due to the residual frequency difference according to AFC.

Further, wireless communication apparatus 1k of the present embodiment has: reference signal phase compensating section 208 that compensates for the phase difference of the signal obtained at reference signal extracting section 204 based on the detection result of phase difference detecting section 205; and second channel estimation section 209 that calculates a channel estimation value using the reference signal where the phase difference is compensated for by reference signal phase compensating section 208.

Further, wireless communication apparatus 1K of the present embodiment interpolates the channel estimation value using the channel estimation result in first channel estimation section 201 and the reference signal where the phase difference is compensated for.

Although a case has been described with the present embodiment where second channel estimation section 209 carries out this interpolation processing, a channel estimation interpolating section may be provided instead of second channel estimation section 209.

By this means, according to the present embodiment, it is possible to obtain the effect of improving the accuracy in estimating a channel estimation value calculated by time domain interpolation processing. This is because, before the time domain interpolation processing, reference signal phase compensating section 208 removes in advance the phase rotation due to the residual frequency difference according to AFC, and so only propagation channel fluctuation components are left in the reference signal. Further, the fluctuation components are decreased in this way and then the time domain interpolation processing is carried out, so that it is possible to improve the accuracy in interpolation.

Further, although a case has been described with the present embodiment where phase compensating section 210 carries out phase compensation for an output of OFDM demodulating section 4, the phase difference may be applied to the channel estimation value calculated by second channel estimation section 209.

Figure 18:
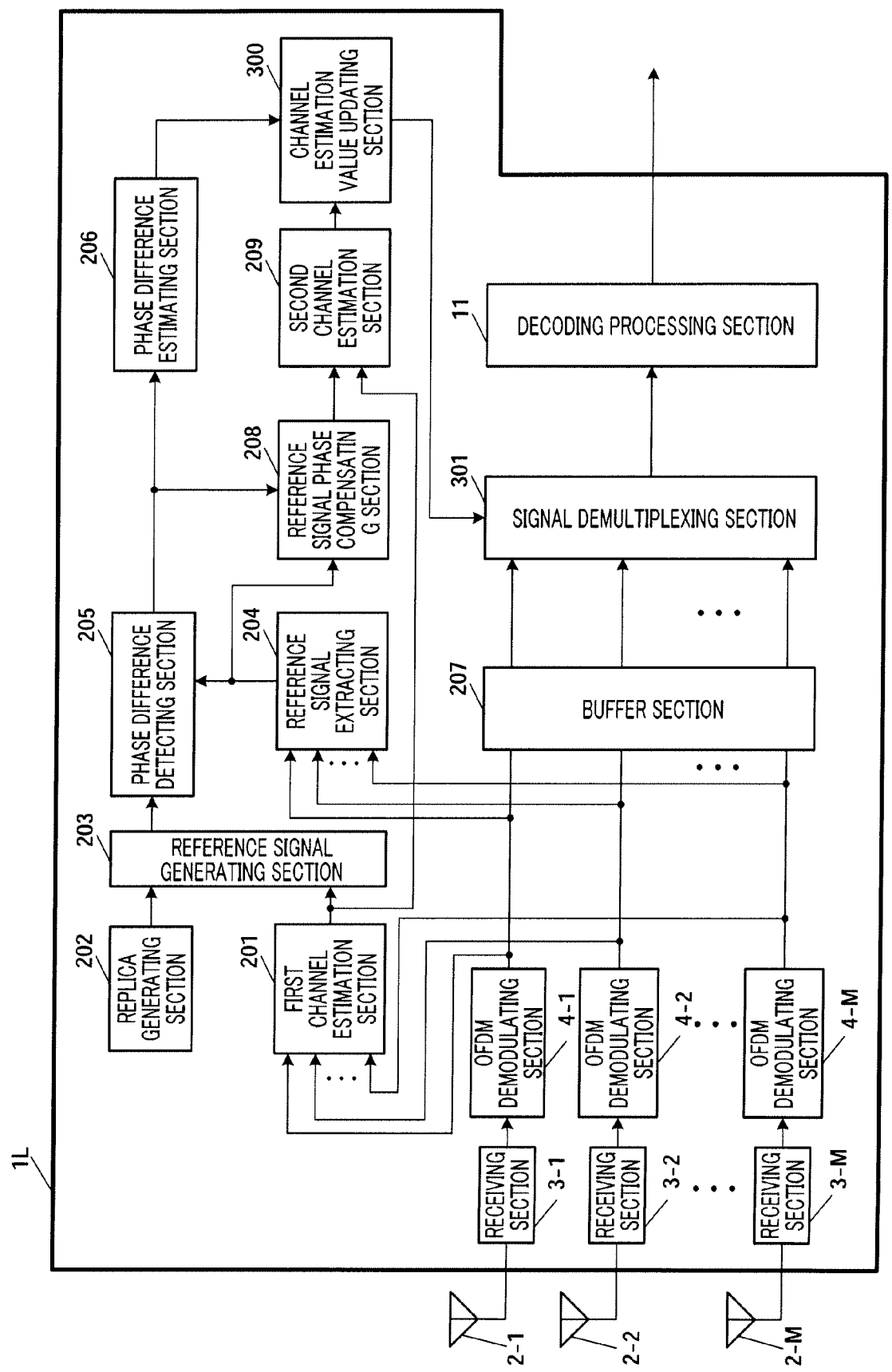
FIG. 18 is a block diagram showing another configuration example of the wireless communication apparatus according to Embodiment 6.

FIG. 18 shows a configuration example of the wireless communication apparatus that carries out such processing. In FIG. 18, the same components as in FIG. 16 are assigned the same reference numerals, and wireless communication apparatus 1L has a configuration that removes phase compensating section 210 from wireless communication apparatus 1K and that adds channel estimation value updating section 300.

Wireless communication apparatus 1L inputs an output of second channel estimation section 209 and an output of phase difference estimating section 206, to channel estimation value updating section 300.

Channel estimation value updating section 300 calculates a channel estimation value obtained by adding the phase difference to channel estimation value He(k, fs) for each subcarrier and each OFDM symbol obtained by second channel estimation section 209 by using the amount of phase rotation L(k, fs) which is the output of phase difference estimating section 206.

That is, as represented by the following equation, channel estimation value updating section 300 calculates channel estimation value Hb(k, fs) which is added the phase difference by multiplying channel estimation value He(k, fs) for each subcarrier obtained by second channel estimation section 209 by the amount of channel estimation value L(k, fs).

[46]

(Equation 46)

$$H_b(k, f_s) = \begin{pmatrix} \exp(jL^1(k, f_s)) & 0 & \cdots & 0 \\ 0 & \exp(jL^2(k, f_s)) & \ddots & \vdots \\ \vdots & \ddots & \ddots & 0 \\ 0 & \cdots & 0 & \exp(jL^M(k, f_s)) \end{pmatrix} H_e(k, f_s)$$

The output of channel estimation value updating section 300 is outputted to signal demultiplexing section 301. Signal demultiplexing section 301 carries out processing of demultiplexing and equalizing (detection processing) subcarrier signals outputted from buffer section 207 based on updated channel estimation value Hb(k, fs). Updated channel estimation value Hb(k, fs) includes the phase rotation due to AFC error, and so signal demultiplexing section 301 is able to carry out demultiplexing and equalization processing even on the phase rotation of the received subcarrier signal.

In this way, wireless communication apparatus 1L of FIG. 18 has: first channel estimation section 201 that calculates a channel estimation value using the known first reference signal included in a received signal subjected to multicarrier modulation; replica generating section 202 that generates a replica signal of the second reference signal included in a time domain different from the first reference signal; reference signal generating section 203 that generates a reference signal that adds channel fluctuation according to the channel estimation value, to the replica signal; reference signal extracting section 204 that extracts the second reference signal from the received signal subjected to multicarrier modulation; phase difference detecting section 205 that detects the phase difference of the received signal by comparing the reference signal obtained by reference signal generating section 203 with the signal obtained by reference signal extracting section 204; and channel estimation value updating section 300 that updates the channel estimation value based on the output of phase difference detecting section 205. By this means, wireless communication apparatus 1L is able to obtain the same effect as wireless communication apparatus 1K of FIG. 16.

Further, the configuration of the present embodiment is directed to carrying out phase compensation for an OFDM demodulated signal of each subcarrier or adding phase compensation to a channel estimation value, and does not depend on the configuration of signal demultiplexing section 211 (301). For this reason, the method of demultiplexing a spatial-multiplex stream in signal demultiplexing section 211 (301) may be changed adaptively. That is, it is possible to use the MLD method if the M-ary modulation value is small and use the ZF method if the M-ary modulation value is large to reduce the circuit scale for 64 QAM.

Further, although cases have been described with above Embodiments 1 to 6 assuming that each OFDM demodulating section 4-1 to 4-M carries out frequency synchronization processing, if the accuracy of frequencies of wireless communication apparatuses on the transmitting side and on the receiving side is sufficiently high, frequency synchronization in OFDM symbol demodulating section 4 may be omitted. If this frequency synchronization is omitted, in the same way of the above-described embodiments, frequency synchronization (AFC processing) and phase synchronization processing may be carried out at the same time.

The present application is based on Japanese Patent Application No. 2006-001588, filed on Jan. 6, 2006, and Japanese Patent Application No. 2007-000138, filed on Jan. 4, 2007, the entire content of which is expressly incorporated by reference herein.

INDUSTRIAL APPLICABILITY

The wireless communication apparatus according to the present invention is preferably applied to wireless communication systems that use transmission formats for spatial-multiplexing and transmitting pilot subcarrier signals.

The invention claimed is:

1. A wireless communication apparatus comprising:
a reference signal generating section that generates a reference signal corresponding to a received spatial-multiplex pilot subcarrier signal;
a spatial-multiplex pilot subcarrier extracting section that extracts a spatial-multiplex pilot subcarrier signal from a received signal subjected to a multicarrier modulation;
a phase compensating section that detects and compensates for a phase difference of the received signal by comparing the reference signal obtained by the reference signal generating section with the spatial-multiplex pilot subcarrier signal obtained by the spatial-multiplex pilot subcarrier extracting section;
a spatial-multiplex pilot subcarrier replica generating section that generates a replica signal of the spatial-multiplex pilot subcarrier signal; and
a pilot subcarrier channel estimation section that calculates a channel estimation value for a pilot subcarrier using a known pilot signal included in the received signal,
wherein the reference signal generating section generates the reference signal by adding channel fluctuation according to the channel estimation value, to the replica signal.

2. The wireless communication apparatus according to claim 1, wherein the phase compensating section finds the phase difference by weighting the phase difference according to a phase relationship in the spatial-multiplex pilot subcarrier.

3. The wireless communication apparatus according to claim 1, wherein:
the received signal is received by a plurality of antennas; and
the phase compensating section detects phase differences for the plurality of antennas using a plurality of the reference signals and a plurality of the spatial-multiplex pilot subcarrier signals and compensates for the phase differences for the plurality of antennas using the detected phase differences for the plurality of antennas.

4. The wireless communication apparatus according to claim 1, wherein:
the received signal is received by a plurality of antennas; and
the phase compensating section comprises:
an inter-antenna averaging section that detects phase differences for the plurality of antennas using a plurality of the reference signals and a plurality of the spatial-multiplex pilot subcarrier signals and averages the detected phase differences for the plurality of antennas; and
an inter-antenna phase compensating section that compensates for the phase differences using outputs of the inter-antenna averaging section.

5. The wireless communication apparatus according to claim 1, wherein:
the received signal is received by a plurality of antennas; and
the phase compensating section comprises:
an inter-subcarrier averaging section that detects phase differences for subcarriers using a plurality of the reference signals and a plurality of the spatial-multiplex pilot subcarrier signals and averages the detected phase differences for the subcarriers; and
an inter-subcarrier phase compensating section that compensates for the phase differences using outputs of the inter-subcarrier averaging section.

6. A wireless communication apparatus, comprising:
a reference signal generating section that generates a reference signal corresponding to a received spatial-multiplex pilot subcarrier signal;
a spatial-multiplex pilot subcarrier extracting section that extracts a spatial-multiplex pilot subcarrier signal from a received signal subjected to a multicarrier modulation;
a phase compensating section that detects and compensates for a phase difference of the received signal by comparing the reference signal obtained by the reference signal generating section with the spatial-multiplex pilot subcarrier signal obtained by the spatial-multiplex pilot subcarrier extracting section;
a spatial-multiplex pilot subcarrier replica generating section that generates a replica signal of the spatial-multiplex pilot subcarrier signal; and
a pilot subcarrier channel estimation section that calculates a channel estimation value for a pilot subcarrier using a known pilot signal included in the received signal,
wherein the reference signal generating section generates the reference signal by adding channel fluctuation according to the channel estimation value, to the replica signal, and
wherein the phase compensating section compensates for the channel estimation value obtained by the pilot subcarrier channel estimation section and the wireless communication apparatus demultiplexes a spatial-multiplex received signal using the channel estimation value compensated for by the phase compensating section.

7. A wireless communication apparatus, comprising:
a reference signal generating section that generates a reference signal corresponding to a received spatial-multiplex pilot subcarrier signal;
a spatial-multiplex pilot subcarrier extracting section that extracts a spatial-multiplex pilot subcarrier signal from a received signal subjected to a multicarrier modulation; and
a phase compensating section that detects and compensates for a phase difference of the received signal by comparing the reference signal obtained by the reference signal generating section with the spatial-multiplex pilot subcarrier signal obtained by the spatial-multiplex pilot subcarrier extracting section,
wherein:
the reference signal generating section comprises:
a spatial-multiplex pilot subcarrier replica generating section that generates a replica signal of the spatial-multiplex pilot subcarrier signal; and
a pilot subcarrier channel estimation section that calculates a the channel estimation value of a pilot subcarrier using a known pilot signal included in the received signal; and
the phase compensating section is an interference cancellation pilot subcarrier phase compensating section that cancels spatial-multiplex pilot subcarrier components as interference components other than a pilot subcarrier, from the spatial-multiplex pilot subcarrier signal based on an output of the pilot subcarrier channel estimation section and an output of the spatial-multiplex pilot subcarrier replica generating section, and carries out phase compensation for the pilot subcarrier from which the interference components are canceled, using the output of the spatial-multiplex pilot subcarrier replica generating section as a reference signal.

8. A wireless communication apparatus, comprising:
a reference signal generating section that generates a reference signal corresponding to a received spatial-multiplex pilot subcarrier signal;
a spatial-multiplex pilot subcarrier extracting section that extracts a spatial-multiplex pilot subcarrier signal from a received signal subjected to a multicarrier modulation; and
a phase compensating section that detects and compensates for a phase difference of the received signal by comparing the reference signal obtained by the reference signal generating section with the spatial-multiplex pilot subcarrier signal obtained by the spatial-multiplex pilot subcarrier extracting section, wherein the phase compensating section detects the phase difference using a following equation, $$L_c(m) = \text{angle}\left[\sum_{f_n \in PSC(m)} Y_e(m, f_n) \cdot * S_{PSC}^*(m, f_n)\right]$$

where Lc(m) is a phase difference to be detected, angle[x] is an operator for calculating a phase of variable x in a complex number, PSC(m) is a pilot subcarrier number included in an m-th orthogonal frequency division multiplexing symbol, Ye(m, fn) is a pilot subcarrier signal subjected to spatial-multiplexing transmission using an fn-th subcarrier in the m-th orthogonal frequency division multiplexing symbol, SPSC(m, fn) is a reference signal for the pilot subcarrier signal subjected to spatial-multiplexing transmission using the fn-th subcarrier of the m-th orthogonal frequency division multiplexing symbol and a symbol ".*" represents multiplication carried out per vector element.

* * * * *

UNITED STATES PATENT AND TRADEMARK OFFICE
CERTIFICATE OF CORRECTION

PATENT NO. : 8,243,834 B2
APPLICATION NO. : 12/159080
DATED : August 14, 2012
INVENTOR(S) : Takaaki Kishigami et al.

It is certified that error appears in the above-identified patent and that said Letters Patent is hereby corrected as shown below:

In the Specifications:
Column 9, lines 1-5, equation 9, incorrectly reads:

" $$L_c(m) = angle[\sum_{f_n \in PSC(m)} Y_e(m, f_n) \cdot * S^*_{PSC}(m, f_n)]$$ "

and should read:

-- $$L_c(m) = angle[\sum_{f_n \in PSC(m)} Y_e(m, f_n) .* S^*_{PSC}(m, f_n)]$$ --.

In the Claims:
Claim 2, column 35, lines 42-43, incorrectly reads:

"to a phase relationship in the spatial-multiplex pilot subcarrier"

and should read:

-- to a phase relationship in the spatial-multiplex pilot subcarrier signal --.

Claim 7, column 36, line 63. incorrectly reads:

"lates a the channel estimation value of a pilot subcar-"

and should read:

-- lates a channel estimation value of a pilot subcar- --.

Signed and Sealed this
Second Day of July, 2013

Teresa Stanek Rea
*Acting Director of the United States Patent and Trademark Office*

CERTIFICATE OF CORRECTION (continued)
U.S. Pat. No. 8,243,834 B2

Claim 8, column 38, lines 1-5, incorrectly reads:

" $$L_c(m) = angle[\sum_{f_n \in PSC(m)} Y_c(m,f_n) \cdot * S^*_{PSC}(m,f_n)]$$ "

and should read:

-- $$L_c(m) = angle[\sum_{f_n \in PSC(m)} Y_c(m,f_n) . * S_{PSC}{}^*(m,f_n)]$$ --.